(12) United States Patent
Lert, Jr. et al.

(10) Patent No.: US 7,991,505 B2
(45) Date of Patent: Aug. 2, 2011

(54) MATERIALS-HANDLING SYSTEM USING AUTONOMOUS TRANSFER AND TRANSPORT VEHICLES

(75) Inventors: John G. Lert, Jr., Watertown, MA (US); Foster D. Hinshaw, Cambridge, MA (US)

(73) Assignee: CasePick Systems, LLC, Watertown, MA (US)

( * ) Notice: Subject to any disclaimer, the term of this patent is extended or adjusted under 35 U.S.C. 154(b) by 712 days.

(21) Appl. No.: 12/002,309

(22) Filed: Dec. 14, 2007

(65) Prior Publication Data
US 2009/0074545 A1    Mar. 19, 2009

Related U.S. Application Data

(63) Continuation-in-part of application No. 10/928,289, filed on Aug. 28, 2004, now Pat. No. 7,591,630.

(60) Provisional application No. 60/498,688, filed on Aug. 29, 2003, provisional application No. 60/875,127, filed on Dec. 15, 2006.

(51) Int. Cl.
*G06F 7/00* (2006.01)
*B65G 65/00* (2006.01)
*B65G 1/00* (2006.01)
*B65H 1/00* (2006.01)

(52) U.S. Cl. ........ 700/214; 700/216; 700/228; 414/284; 414/806; 414/268; 414/275; 198/347.1

(58) Field of Classification Search .................. None
See application file for complete search history.

(56) References Cited

U.S. PATENT DOCUMENTS

| | | | | |
|---|---|---|---|---|
| 3,927,773 | A * | 12/1975 | Bright | 414/273 |
| 4,428,708 | A * | 1/1984 | Burt | 414/275 |
| 5,903,464 | A * | 5/1999 | Stingel et al. | 700/215 |
| 6,729,836 | B2 * | 5/2004 | Stingel et al. | 414/791.6 |
| 6,854,583 | B1 * | 2/2005 | Horn | 198/348 |
| 6,929,440 | B1 * | 8/2005 | Grond | 414/284 |
| 6,974,928 | B2 * | 12/2005 | Bloom | 209/583 |

\* cited by examiner

*Primary Examiner* — Gene Crawford
*Assistant Examiner* — Yolanda Cumbess
(74) *Attorney, Agent, or Firm* — Perman & Green, LLP

(57) ABSTRACT

Methods and apparatus for selecting and combining packages in an outbound container by employing autonomous transfer and transport vehicles which move on a network of roadways to carry a plurality of individual cases each containing the same kind of product from a loading station and to a destination station where individual packages are combined in the outbound container. The travel of each vehicle through the roadway network is computer controlled, and each vehicle includes means for automatically loading and unloading packages from predetermined locations on the network.

15 Claims, 18 Drawing Sheets

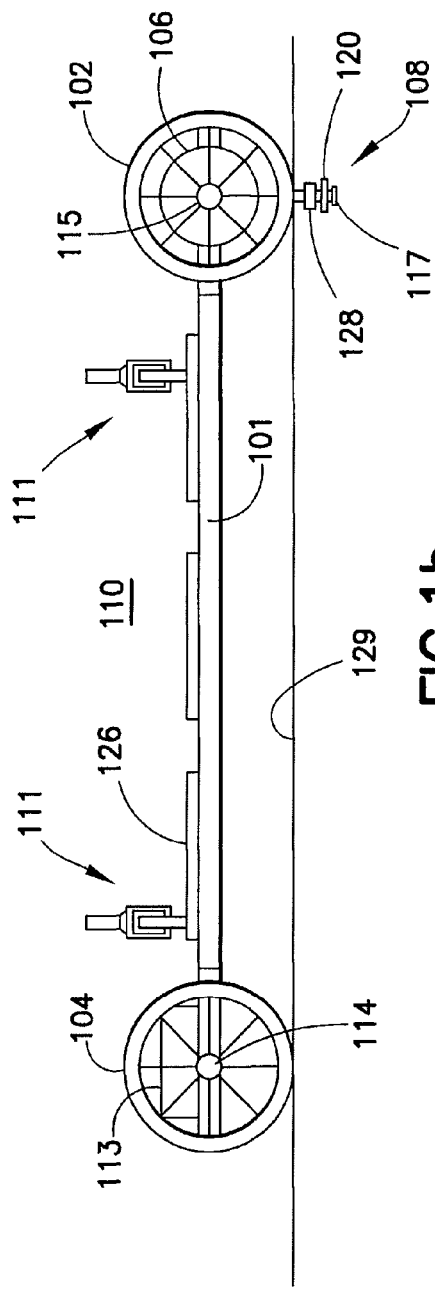
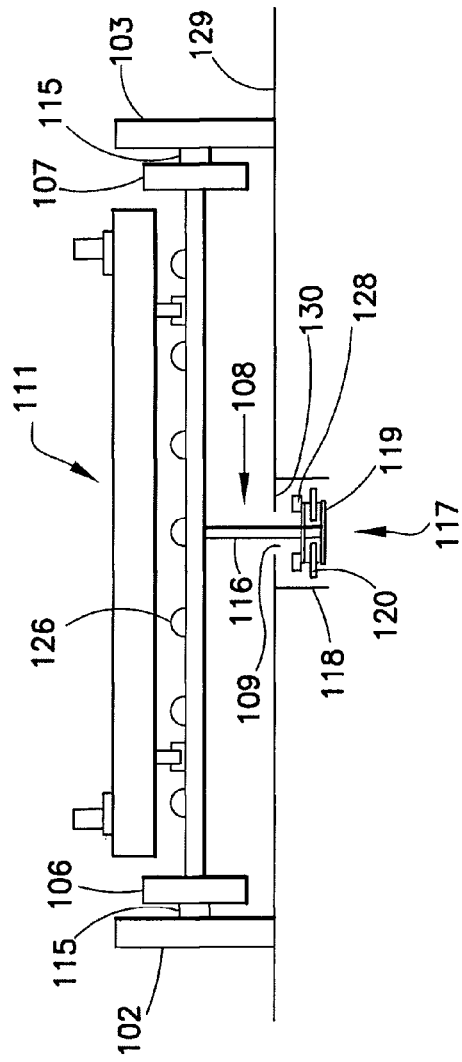
FIG.1b
FIG.1c

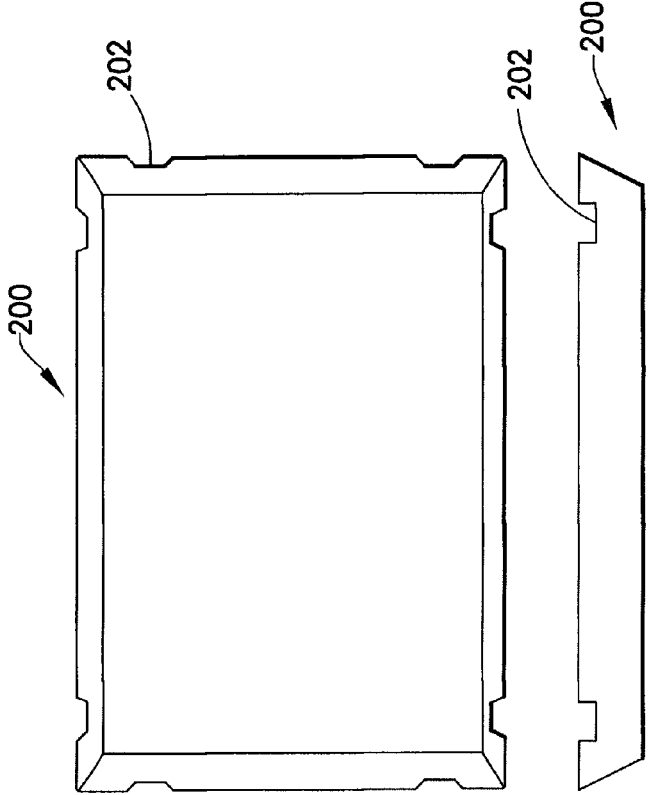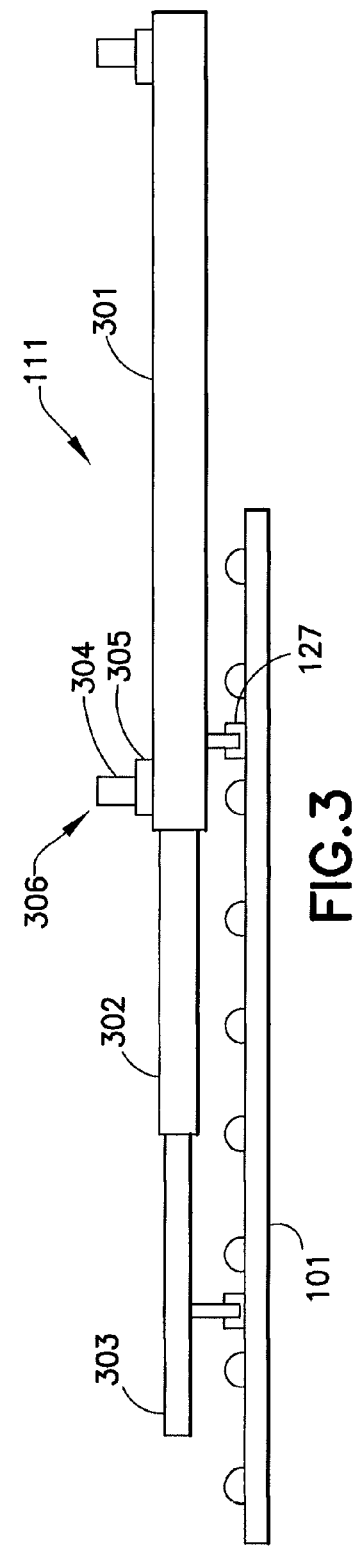

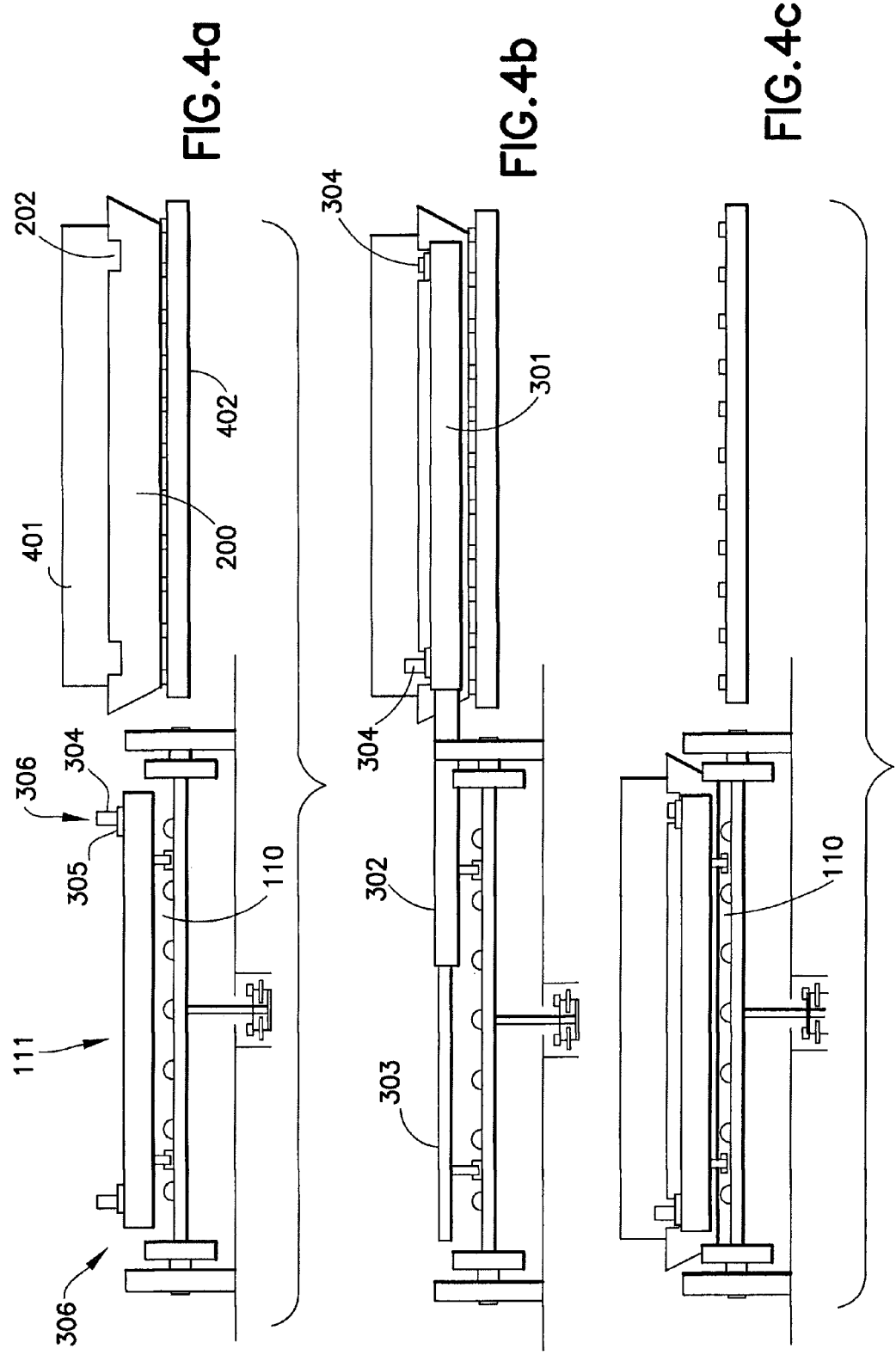

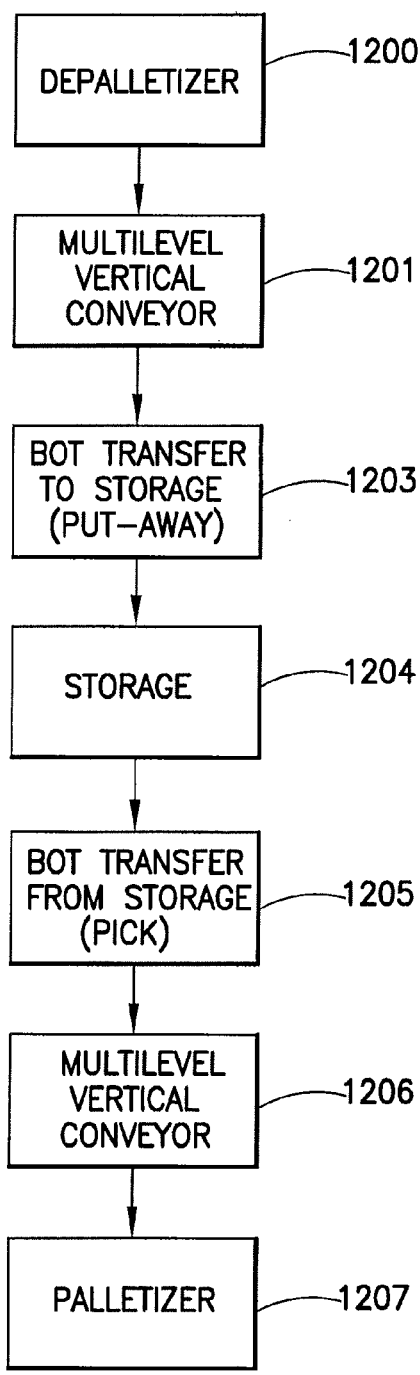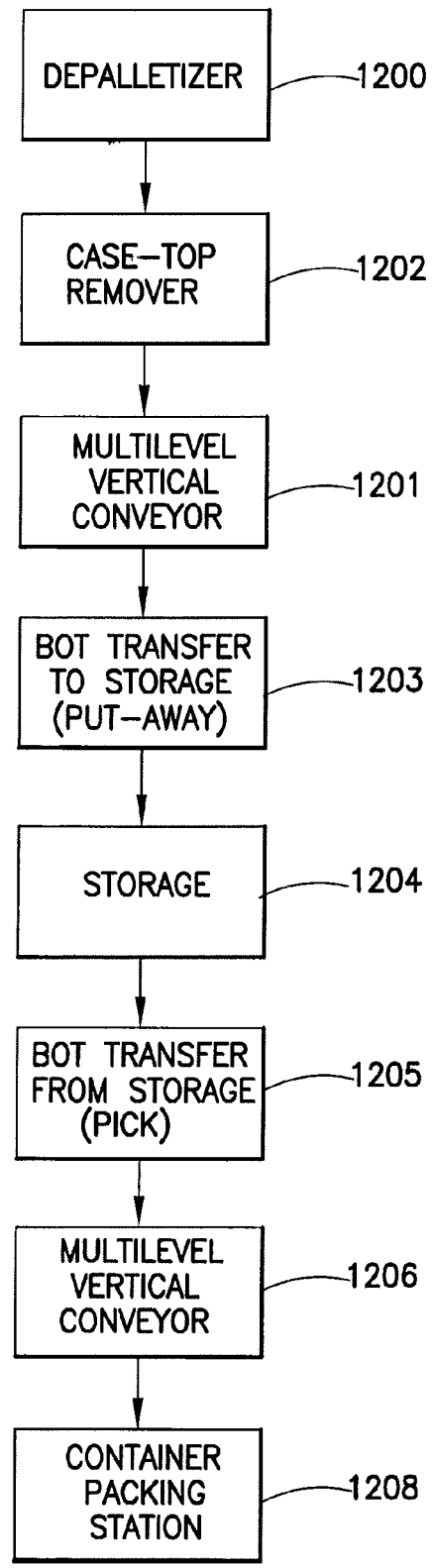
FIG.12a
FIG.12b

MATERIALS-HANDLING SYSTEM USING AUTONOMOUS TRANSFER AND TRANSPORT VEHICLES

CROSS REFERENCE TO RELATED APPLICATIONS

This application is a non-provisional of and claims the benefit of the filing date of U.S. Provisional Patent Application Ser. No. 60/875,127 filed on Dec. 15, 2007.

This application is also a continuation in part of and claims the benefit of the filing date of U.S. patent application Ser. No. 10/928,289 filed on Aug. 28, 2004 now published as U.S. Application Publication No. 2005/0047895 entitled "Materials-handling system using autonomous track-guided transfer and transport vehicles" which was a non-provisional of U.S. Provisional Patent Application Ser. No. 60/498,688 filed on Aug. 29, 2003.

The disclosures of each of the foregoing applications is incorporated herein by reference.

FIELD OF THE INVENTION

The present invention relates to materials-handling systems and methods in general, and more specifically to the systems and methods used to selectively pick cases and individual items of merchandise to fulfill orders within retail distribution systems.

BACKGROUND OF THE INVENTION

Retail distribution systems process merchandise at three basic levels of aggregation. The first and most granular level is the individual item unit as packaged for sale to consumers. The second level is the "case", the container that is filled with item units at the factory, sealed, and then unsealed either at the store when the items are placed onto shelves or at an order-fulfillment center where items are to be picked to fill customer orders. The third level of aggregation is the pallet, onto which multiple cases are stacked for bulk shipping, typically by truck.

By far the most pervasive materials-handling process within any retailer's distribution system is the selective retrieval ("picking") of merchandise from inventory—either cases or individual item units—to fill orders. Yet, despite a steadily increasing level of automation of various materials-handling processes, order-picking remains a mostly manual and labor-intensive process, generally using some variant of the relatively inefficient "man-to-goods model".

In high-volume retail channels, the standard ordering unit for store-level replenishment is the case. Case-picking to fill store orders (or "order selection", as it is usually called) occurs in retail distribution centers ("DCs"). Merchandise arrives at the DC from manufacturers or intermediate suppliers on pallets, each pallet typically containing cases of a single product. The task of the DC is to ship to the stores pallets containing a specified number of cases of many different products. The primary method used to transfer cases from incoming pallets to outgoing pallets is a manual process that has changed little over many decades: single-product pallets are placed at picking locations arranged in opposing rows separated by aisle spaces, and human operators ("selectors") travel on motorized vehicles through those aisles, building mixed pallets as they go. On board each vehicle are one or more (typically two) pallets, and the job of the selector is to drive the vehicle to a series of single-product pallets and place a specified number of cases of each product on the specified outbound pallets. There have been attempts to use machines to automate case selection, but none has enjoyed significant commercial success to date, and manual case-selection is used in the vast majority of retail distribution centers in operation today.

Picking of individual item-units occurs at various points in retail distribution. For example, DCs that supply stores whose physical size and sales volumes are too small for case-quantity replenishment must ship individual item units. Types of stores that are usually replenished in less-than-case-quantity include convenience, drug, and specialty goods. In addition, there is an ever-increasing demand for item-level picking to fill orders that are delivered directly to end-users or consumers, driven largely by the growth in "e-commerce", i.e. electronic orders placed from personal computers via the Internet. A variety of "man-to-goods" methods are used to perform item-level picking. In applications where the picking volume is low or the product assortment is limited, the model is very similar to that used in case-level order-selection described above or for that matter by shoppers in a self-service store, with pickers taking containers to item locations to make the picks. In applications with higher volume and wider product assortment, "zone" picking is more typical, with each picker stationed in a designated area, or zone, and responsible for picking all ordered items in that area and placing them into totes that move through the zone on conveyors.

Depending on the application and configuration of the order-fulfillment process, pickers in a typical "man-to-goods" process spend only 15% to 30% of their work time actually picking the items and placing them either on a pallet or in a container and the rest of the time traveling to the picking locations, ensuring that the target pick is the right item, ensuring the right number of items have been picked, or just waiting to perform the next transaction. A number of technologies, such as barcode scanning, voice-direction, and pick-to-light have been developed that improve accuracy and improve productivity of non-travel tasks, but the only way to achieve dramatic improvements in labor efficiency is to use a goods-to-man picking model in which the goods to be picked flow to stationary workstations. There have been efforts to create "goods-to-man" item-picking models, most notably through the use of carousels and automated storage-and-retrieval cranes, but these solutions are typically very expensive and have not been widely adopted.

Of course, by far the most prevalent form of item-picking in retail is that performed by customers shopping in self-service stores—indeed the very term "self-service" refers specifically to the process of customers picking their own orders. There have also been attempts to create a new retail operating model—an automated full-service store—by automating this item-picking process. This operating model would have numerous advantages over the self-service model, as it would enable much more efficient and effective operations by the retailer and would provide a much more enjoyable and time-efficient shopping experience to the customer. Some examples of attempts to create this retail operating model include U.S. Pat. Nos. 3,746,130 and 5,890,136 and 5,595,263 and 5,933,814 and 5,595,264 and 5,186,281. Unfortunately, none of these attempts to automate order-fulfillment in a retail store has been successful, primarily because a material-handling system has never existed that can satisfy the very challenging requirements of this application effectively and affordably.

SUMMARY OF THE INVENTION

The objective of the invention is to provide a materials-handling system that allows a high degree of automation in the picking of orders at both case-level and item-level, and to automate item-level order picking so effectively that it can be used for real-time order-picking in an automated full-service retail store.

The preferred embodiment of the invention is an automated materials handling system that is controlled by a programmed processor that issuing command signals to control a number of case-handling transport mechanisms, including a plurality of autonomous wheeled transport vehicles that are each responsive to command signals for transporting a case from a specified origin location to a specified destination location. The system employs a warehouse of temporary storage locations positioned on each of a plurality of different vertical levels. Each level includes at least one input transfer station, at least one output transfer station, and a plurality of aisle guideways each of which supports and guides one or more of the wheeled transport vehicles for movement between of a pair of opposing rows of horizontally distributed temporary storage locations. An input interconnecting guideway supports and guides one or more of the wheeled transport vehicles for movement between an input transfer station and each of said aisle guideways on that level. Similarly, an output interconnecting guideway supports and guides transport vehicles for movement between the output transfer station and each of said aisle guideways on that level.

Incoming cases transported from remote manufacturing locations are delivered on pallets to a receiving station from which the cases are transferred to an input conveyor including a vertical transport mechanism responsive to command signals from said processor for selectively transporting each received case to an input transfer station positioned on a specified one of the vertical levels. Item units ordered by a customer (either by the case of individually) are combined at an order assembly station for shipment. Wheeled vehicles operating in response to commands from the processor retrieve cases from the specified storage locations and move them to an output transfer station on each level, from which the cases are moved by an output conveyor including a vertical transport to an output order assembly station for shipment to the customer.

These and other features of the invention will be more clearly understood by considering the following detailed description of two embodiments of the invention.

BRIEF DESCRIPTION OF THE DRAWINGS

In the detailed description which follows, frequent reference will be made to the attached drawings, in which:

FIGS. 1a, 1b, and 1c are top, side, and front views, respectively, of a first embodiment of the autonomous transfer and transport vehicle.

FIGS. 2a and FIG. 2b are top and side views, respectively, of an example of a carrier tray used in the first embodiment.

FIG. 3 shows a side view of the operation of one of the transfer arms according to the first embodiment of the invention.

FIGS. 4a through 4c show a side view of the sequence of transferring a payload from storage rack onto payload bay in the first embodiment of the autonomous transfer and transport vehicle.

FIGS. 12a and 12b show schematic diagrams of the flow of cases of merchandise through the system for case-picking and item-picking applications, respectively, using the preferred embodiment of the present invention.

DETAILED DESCRIPTION

Figure 1A:
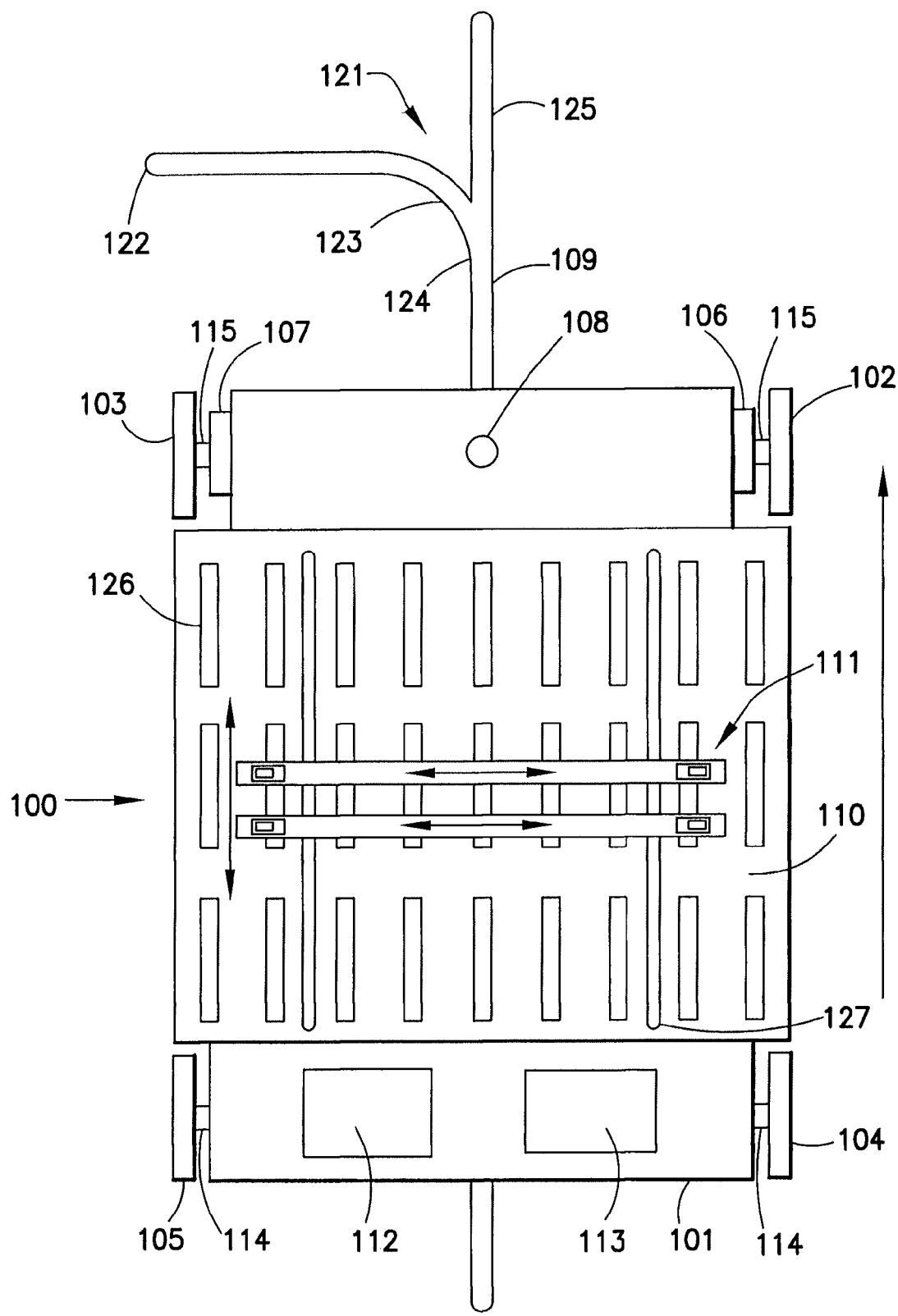

Two embodiments of the invention are described below. The first embodiment depicted in FIGS. 1-11 was the subject of the above-noted U.S. application Ser. No. 10/928,289 published as U.S. Patent Application Publication No. 2005/0047895 A1. The second embodiment, shown in FIGS. 12-18, is an alternative preferred arrangement.

For the sake of brevity and in keeping with George Lucas' alphanumeric naming convention for robots, the Track-guided Transfer and Transport Vehicle of the first embodiment is called "T3V". In order to distinguish the autonomous transfer and transport vehicle used in the preferred embodiment from that of the first, the more generic term of "bot" (short for "robot") is used.

The first and second embodiments are similar but differ in several ways which can be briefly summarized as follows: The track-guided transfer and transport vehicles (the "T3V" used in the first embodiment and the "bot" used in the second embodiment) employ different but similar mechanism for transporting cases and transferring them to and from the vehicle: in the first embodiment cases are placed into trays so that the T3V only handles trays, whereas in the second embodiment the bot handles cases directly. The two embodiments employ different structures for supporting and guiding the transport vehicles, and the storage shelves which hold cases in the automated warehouse are differently constructed. The two embodiments use different methods and mechanisms for moving cases vertically into and out of the storage structure: in the first embodiment, vertical movement of cases is performed directly by the transport vehicles using ramps, whereas in the second embodiment vertical movement of cases is performed by vertical conveyors. These and other differences and similarities between the two embodiments may be better understood by considering the detailed description of these two embodiments that follows.

Overview

Both of the embodiments described below are materials-handling systems designed to pick orders using autonomous vehicles to handle individual cases of merchandise and perform the functions of both (1) transferring cases into and out of storage locations (e.g., a rack) and (2) transporting the cases within the work facility. In most prior-art systems these two functions are typically performed by separate subsystems, such as an automated storage-and-removal system combined with conveyors. In the present invention, each autonomous vehicle is equipped with a transfer assembly that moves a case payload laterally onto and off of its payload bay, and with propulsion and guidance mechanisms that enable the vehicle to carry its payload from location to location within the workspace. Combining both transfer and transport functions within a single subsystem greatly simplifies the overall design and operation of the system, thereby reducing costs, increasing reliability, and providing design flexibility in addressing application-specific system requirements.

The approach solves the order-picking problem by enabling a "goods-to-man" picking model that is far more labor efficient than the conventional "man-to-goods" model, and much less expensive and more effective than previous solutions. Incoming cases of merchandise are depalletized, transported individually into holding storage by the transfer/transport vehicles, and then selectively retrieved and transported by those same vehicles to order-assembly workstations, either pallet-building stations or item-pick-and-pack stations. If the workstations are manual, labor is used much more productively because all of the time is spent is picking and placing. Moreover, this model makes it possible eventually to replace the human operator altogether with a robotic picker or pallet-building machine in a totally automated "goods-to-robot" model.

While each vehicle is designed to handle a small number of individual cases (only one in the first embodiment), a key aspect of the present invention is "massively parallel" operation: a given system will use many of these vehicles to achieve the necessary level of total system throughput, all operating independently of each other. For example, if a single vehicle can perform an average of 50 transactions per hour of only one case per transaction, a system with 200 vehicles would have a theoretical throughput capacity of 10,000 case-transactions per hour, though in actual practice total system throughput degrades somewhat as additional vehicles are added due to collision-avoidance and congestion delays.

The use of track-guidance of the vehicles is optional but highly advantageous in order to maximize speed of travel with the simplest possible vehicle design. Track-guidance allows safe travel at high speed by mechanically controlling the path of vehicular motion without complex guidance-control and navigational systems. High-speed travel is important to maximizing throughput capacity, since the throughput of each vehicle is a function of how fast it can travel from one point to another, and simplicity of vehicle design is an important factor in minimizing system cost and maximizing reliability.

Track-guidance can take a variety of forms. Both embodiments to be described employ a slotted "guideway", i.e. a roadway with a guide-slot in the center into which extends a guide pin attached to the vehicle. In order for vehicles to have random access to multiple locations within a facility, a key element of the preferred embodiment is a network of guideways interconnected by branching points where the vehicles can change guide-paths. With slot-guidance, the wheels of the vehicle can simply roll over the slot, so branching can be achieved with a purely passive guideway (i.e. no active switches), and extremely simple steering means on the vehicle that controls which of two conjoined slots the guide-pin enters.

A multi-level storage structure holds the cases of merchandise that are the picking stock available to fill orders. Each level of this structure has multiple picking aisles consisting of opposing storage racks separated by T3V guideways that are interconnected so that T3Vs have random access to the cases of merchandise. T3Vs are able to elevate themselves to upper levels of the storage structure by means of ramps, which are a highly advantageous alternative to the use of mechanical lifts.

Another optional but beneficially simplifying element of the first embodiment of the present invention is the use of a "carrier tray" to contain the cases of merchandise so that T3Vs manipulate the carrier trays instead of the cases themselves. The carrier tray serves two important purposes. First, it creates a standard mechanical interface to the payload-transfer mechanism on the T3V, isolating it from the wide variations in sizes, shapes, and materials of the cases being handled. This results in a transfer mechanism that is simpler, less expensive, and more reliable in operation than one which must be able to manipulate cases directly. The second advantage of the carrier tray is the containment of any spillage or leakage of item contents in the case. This benefit is especially important given the difficulty of cleaning up the messes in the storage structure that would result from uncontained spills and leaks, and the consequent impact on operations. However, the use of the carrier tray carries a penalty in terms of storage density within the storage structure, as well as process complexity since cases have to be placed in and then removed from the trays.

T3Vs enable a novel and highly efficient operating model for a retail DC in which the picking-stock is first depalletized and the individual cases are inserted into carrier trays, picked up by T3Vs and transported into the storage structure. Cases are then selectively retrieved by T3Vs and transported to pallet-building workstations, offloaded by T3Vs, removed from the carrier trays, and placed onto the mixed pallets for eventual delivery to stores. It is or will soon be possible for all of the processes on both sides of T3V activity to be performed by robots or other machines, so that the operation of the entire DC can be completely automated.

A very similar operating model can be used for item-level picking in an order-fulfillment center or small-store distribution center. Cases are depalletized and then have their tops removed to expose the individual item units for picking. These open cases are then inserted into carrier trays, picked up by T3Vs and transported into the storage structure. Cases are then selectively retrieved by T3Vs and transported to pick-and-pack workstations where individual item units are removed from their cases and placed into containers (totes, boxes, bags, etc.) for delivery to the end user. Cases are then returned to storage unless empty. At the current time, the actual picking of the item is believed to be beyond the capabilities of affordable robots and must be performed by humans, though at maximum labor efficiency.

The use of an transport and transfer vehicle is such an effective solution to the problem of automating item-picking that it also for the first time makes practicable real-time order fulfillment in the automated retail store. A retail store implementing the invention is basically an item-level order-fulfillment facility combined with a shopping section in which items for sale are displayed singly for customers to evaluate. Rather than collecting items for checkout, customers order items via a shopping terminal to be picked by the automated order-picking system.

Design Detail of the First Embodiment

The T3V (100) employed in the first embodiment is depicted in FIG. 1*a* (top view), FIG. 1*b* (side view), and FIG. 1*c* (front view). The vehicle has:

(a) a chassis frame (101), to which are attached the following major elements of the vehicle:
(b) four wheels, two of which are drive wheels (102, 103) and the other two of which are free turning (104, 105);
(c) two drive motors (106, 107) that propel the vehicle by directly driving each of the two drive wheels (102, 103), and also provides braking by reversing thrust electronically;
(d) a guide-pin assembly (108) at the front of the vehicle that engages the slot (109) in the guideway to control direction of vehicular movement;
(e) a payload bay (110) that holds cases in carrier trays;
(f) two transfer arms (111) that physically pull carrier trays onto the payload bay (110) and pushes them off;
(g) an electronics module (112) containing an embedded control computer and related interface circuitry, including a wireless local-area network interface by which the embedded computer and a system master computer communicate with each other;
(h) sensors that provide information to the control computer, especially about the external environment, such for reading location markers or aligning the transfer arms with a target carrier tray in preparation for a payload transfer; and
(i) a rechargeable battery and related power-conditioning and distribution circuitry (113), along with connection to external power.

In the T3V, the drive wheels (102, 103) are at the front of the vehicle along with the guide-pin (108), and two drive motors (106, 107) are used, one for each drive wheel. While a design using a single drive motor with a differential transmission rather than dual drive motors is certainly feasible, the use of two direct drive motors (1302) has the advantage of mechanical simplicity. The use of brushless-DC drive motors, either single or dual, also eliminates the need for mechanical brakes since regenerative braking turns the motor into a generator that converts kinetic energy of bot motion to electrical energy, both slowing the bot and recharging the battery. Elimination of these mechanical components, and the use of a second drive motor in place of a differential transmission, also increases system reliability since brushless-DC drive motors typically have extremely low failure rates.

In the T3V, each rear wheel (104, 105) is attached to the chassis (101) through a ball-jointed hub bearing (114) that allows the wheel to turn freely and also allows the wheel to pivot vertically in order to point in the direction of travel, thereby preventing "tire scrub". At the front of the vehicle, it is the two drive motors (106, 107) that are attached directly to the chassis (101), and each wheel (102, 103) is attached to the rotating output drive shaft (115) of one of the motors. One problem often encountered with a direct-drive electric motor is the lack of torque at low RPM normally provided by the mechanical advantage of a conventional transmission system. This problem may be solved by the use of a drive motor based on the teachings in U.S. Pat. No. 5,067,932, which can apply maximum torque to the drive shaft at any speed.

As stated earlier, slot-guidance of the T3V is optional but is to enable high vehicular speeds without the cost and design-complexity that would be required by unconstrained self-guidance and -navigation. The key objectives in the design of the slot-guideway and guide-pin assembly are to minimize mechanical stress and frictional wear that will tend to result from high-speed travel. In the T3V shown in FIG. 1*b* and FIG. 1*c*, the guideway consists of a slot (109), or gap, in the center of the roadway (129), below which is a channel formed by opposing vertical sidewalls (118) on each side of the slot (109) extending down from the roadway (129). The guide-pin assembly (108) consists of a guide-pin shaft (116) that is attached at the top to the chassis (101) and extends down into the slot guideway (109), and a pin-tip sub-assembly (117) attached to the end of the shaft (116) that actually engages the guideway mechanically by making contact with a vertical sidewall (118) extending down from underneath the roadway (129) surface. The pin-tip assembly (117) consists of a bracket (119) that is bolted to the end of the guide-pin shaft (116) and holds two contact wheels (120), one on each side of the guideway, which spin horizontally when the wheel (120) comes into contact the vertical sidewall (118) as the vehicle is moving so as to minimize friction between the guide-pin assembly and the guideway that would otherwise result in significant wear and tear at high vehicle speeds. Thus, when a contact wheel (120) makes contact with the sidewall (118), frictional energy is converted to rotational energy through the spinning of the wheel. The materials used for both the contact wheel (120) and the sidewall (118) should have very low friction coefficients and be wear-resistant. Of the two, the sidewall material should be the harder and more wear-resistant so that wear and tear will primarily occur in the contact wheels, which are readily replaceable, rather than the sidewalls, which are not. It should also be noted that the guide-pin assembly (108) should preferably be positioned in the center of a line connecting the hubs of the two drive wheels (102, 103), due to the use of ramps, so that the pin-tip assembly (117) will always be at the same vertical elevation as the drive wheels.

If T3Vs were required only to travel on a single closed-loop guideway like a typical toy slot-car racer, no additional directional control would be needed other than the interaction of the guide-pin assembly (108) in the guideway slot (109). However, since the order-picking solution absolutely requires T3Vs to have random access to as many storage locations as possible, the T3Vs must be able to change guideways in the course of navigating to a selected location. This capability is provided by a network of interconnected guideways featuring forks where two guideways connect, and by providing the T3V with the capability of selecting which of the two guideways to take when moving through a fork. U.S. Pat. No. 5,218,909 describes one method for providing this switching capability in a slot-car racer by moving the guide-pin vertically to either pass over (in the raised position) or engage (in the dropped position) a sub-surface diverting element in the track. While this method could certainly be used in an embodiment of the present invention, a simpler and more reliable approach is used in the T3V takes advantage of the steering effect of a force differential between the two drive wheels.

A fork in the guideway is formed when a first guideway is conjoined with a second intersecting guideway. As depicted in FIG. 1*a*, for example, a fork (121) is formed when a first guideway slot (109) is joined by a second guideway slot (122) that runs perpendicular to the first. In the T3V, the segment (123) of the second slot (122) that merges with the first slot (109) is an arc, or curve, that allows a smooth turn in the transition from the first guideway slot (109) to the second (122). It is always the case at a fork that one side of the first slot (109) is contiguous only with itself, i.e. the corresponding side of the continuation of the same slot beyond the fork, while the other side of the first slot (109) is contiguous only with the corresponding side of the second slot (122). Where the second slot (122) is intersecting from the left (from the point of view of the T3V facing forward), as shown in FIG. 1a for example, the right side of the first slot (109) is contiguous to itself, while the left side of the first slot (109) is contiguous with the left side of the second slot (122), joining it at the point (124) where the arced segment (123) of the second slot (122) merges with the first slot (109). Where the second slot intersects from the right, the relative sides are reversed.

This feature makes it possible for the T3V (100) to select which guideway to take at a fork by applying a lateral force to the guide-pin assembly (108) as it moves through the fork (121) to keep the pin-tip assembly (117) in contact with the sidewall (118) contiguous to the selected slot. In the T3V, this lateral force is generated by means of a differential in the forces acting upon the two drive wheels (102, 103), as is explained more fully below. There are, of course, other ways to create this lateral force, such as a mechanical means for physically displacing a movable guide-pin, similar to the mechanism used in U.S. Pat. No. 5,928,058 for causing a toy slot-car racer to shift lanes, or by using a conventional steering mechanism that turns wheels to change direction.

To further understand how the T3V selects between two guideways at a fork, consider what happens when the T3V (100) in FIG. 1a moves through the fork (121). When the guide-pin is approximately at the point (124) of contiguity between the two slots (109, 122), the drive motors (106, 107) produce a differential in forces acting upon the drive wheels (102, 103), for example by applying a braking force to one wheel while applying power to the other, which results in a lateral force on the guide-pin in the direction toward the lesser-powered wheel, pressing the pin-tip assembly (117) against the sidewall (118) on that side of the slot. If the T3V is to go straight at the fork, i.e. remain on the first guideway, the drive motor (106) on the right side of the vehicle brakes its drive wheel (102), while the drive motor (107) on the left side of the vehicle holds constant or increases the power it is applying to its drive wheel (103). The pin-tip assembly (117) is pressed against the right sidewall (118) as the T3V moves through the fork (121), so the guide-pin assembly (108) remains engaged in the first slot (109) and the T3V continues on the same guideway. Once the guide-pin has moved past the point (125) that marks the end of the fork (121) and the continuation of the first slot (109), power is once again applied by the right-side drive motor (106) to the right drive wheel (102) to equalize the forces acting upon the two drive wheels and continue moving the T3V in a straight line.

On the other hand, if the T3V (100) is to turn left at the fork (121), i.e. transfer to the second guideway, the opposite maneuver is performed. As the guide-pin assembly (108) moves past the point (124) of contiguity between the two slots (109, 122), the left-side drive motor (107) applies a braking force to its wheel (103), while the right-side drive motor (106) holds constant or increases the power applied to its drive wheel (102). The pin-tip assembly (117) is then presses against the left sidewall (118) of the first slot (109) and follows the curve of the sidewall into the second slot (122) and the T3V will begin making the left-hand turn. Once the guide-pin assembly (108) is fully inserted into the second slot (122), the braking force on the left-side drive wheel (103) can be released, but because the T3V is now in the process of making a left turn, the inside and outside wheels must still turn at different speeds. The inside (left) drive wheel (103) is allowed to turn freely, with no power applied, while power is still applied to the outside (right) drive wheel (102). When the guide-pin reaches the end of the curved segment (123) and the beginning of the straightaway, the left-side drive motor (107) resumes powering its drive wheel with equal force to that of the right-side drive motor (106), so the wheels now turn at the same speed and propel the T3V in a straight line. (Note that whenever the T3V is going through a turn, the drive motor on the outside wheel applies power but the drive motor on the inside either lets its wheel turn freely or, when entering a turn at a fork, applies a braking force.)

In the embodiment described herein, the vehicle is unidirectional, i.e. only travels in one direction, other than small reverse movements needed to align itself with stationary locations. However, it is quite possible to design the vehicle to be bidirectional simply by placing a guide-pin assembly at each end of the vehicle and modifying the assembly to add means to raise and lower the guide-pin. In such an embodiment, the guide-pin at the "front" of the vehicle relative to the direction of movement would always be in the lowered position to engage the guide-slot, and the guide-pin at the "rear" of the vehicle would be raised to a height above the surface of the guideway so that it does not engage the guide-slot.

It is worth noting that an alternative solution to simplifying vehicle navigation would be to use active mechanical switches at the branches which can be moved by remote control, either by a central computer or by a bot directly, so that the vehicle itself is mechanically passive with respect to its navigational control. While this design approach, which is functionally equivalent to a conventional railroad, would provide the simplest possible vehicle design, this benefit would be more than offset by the complexity of active rail switching instead of a purely passive network of guideways. It is for this reason that such an approach is not considered as a preferred embodiment of the invention.

In the T3V, all of the space between the front and rear wheels is used for the payload bay (110) which holds a carrier tray being transported by the T3V. The floor of the payload bay (110) has passive rollers (126) to minimize resistance to the lateral movement of carrier trays during the transfer process. Also mounted to the floor of the payload bay are two tracks (127) that run longitudinally from front to back, onto which are movably attached the two transfer arms (111), by means of which the T3V transfers payloads from a base platform onto its payload bay and from the payload bay to a base platform. (For purposes of this description, the term "base platform" can refer to any horizontal support structure, such as a shelf-like storage rack, a conveyor, a lift, etc.) There are many possible designs of an operable payload-transfer mechanism, such as those taught in U.S. Pat. No. 5,380,139. A key design factor, of course, is whether the transfer mechanism manipulates cases of merchandise directly, as illustrated by the bot transfer mechanism used in the second embodiment, or where the transfer mechanism only manipulates a container which holds the case of merchandise, called herein a carrier tray, as used in the transfer mechanism used in the T3V of the first embodiment. The bot used in the second embodiment uses a set of two transfer arm assemblies that operate together to transfer cases in the acquisition and discharge of a payload, and a set of two gripper-arm subassemblies that secure the cases and prevent them from shifting during travel. In the T3V, the payload-transfer mechanism is implemented as two telescoping transfer-arm assemblies (111) which simultaneously extend to the side of the T3V to transfer payloads (carrier trays containing cases) on and off the payload bay (110).

An example of a carrier tray (200) used in the first embodiment is shown in FIG. 2a (top view) and FIG. 2b (side view).

It is a relatively shallow tray, preferably made of a plastic material, with side walls (201) that are tapered slightly so that empty trays can be nested when not in use, and features that are used by the transfer mechanism to manipulate the tray. In the T3V, these manipulating features are notches (202) in the rim of the tray, one notch at the top of each end of the four sidewalls (201), or eight notches in total, so that the carrier tray can be manipulated in any orientation relative to the transfer arms (111).

Details of a transfer arm (111) are further illustrated in FIG. 3, as viewed from the front of the vehicle. Each transfer-arm assembly (111) consists of two nested telescoping members, an outer member (301) and inner member (302), which are slidably attached to a frame (303), which is in turn movably mounted on tracks (127) on the floor of the payload bay (110) to align properly with a target carrier tray. At each end of each outer telescoping member is a finger tab assembly (306), which consists of a finger tab (304) and an actuator (305) that can rotate the finger tab (304) ninety degrees to either of two positions: a vertical (passive) position and a horizontal (active) position. The finger tab (304) remains in the vertical position except when it is used to effect movement of a carrier tray (200) in a transfer into or off of the payload bay (110). For this purpose it is placed next to a notch (202) in a carrier tray (200) and rotated into the horizontal position in the direction of the carrier tray (200), actually entering the notch (202) to create an interference with the carrier tray. When the telescoping members (301, 302) then move laterally in either direction, the finger tab (304) encounters the vertical wall of the notch (202), so that continued motion of the telescoping members (301, 302) moves the carrier tray. The telescoping members (301, 302) can extend in both directions, right and left, so that the transfer arms (111) can transfer a carrier tray to/from either side of the vehicle. Motors and transmission means such as pulleys or gears (not shown) effect both the lateral movement of the telescoping members (301, 302) and the longitudinal movement of the frame (303) in the tracks (127) on the floor of the payload bay (110).

The operation of the transfer mechanism to transfer a payload is further illustrated in FIGS. 4a through 4c. The T3V begins the transfer sequence by positioning itself next to the target carrier tray (200) containing the case payload (401) resting on a base platform (402), as depicted in FIG. 4a, and independently moving each transfer-arm assembly longitudinally to align with the edge of the target tray. Then, as illustrated in FIG. 4b, the two telescoping members (301, 302) of each transfer-arm assembly (111) are extended to the point that the forward finger tab (304) on each arm is aligned with the rearmost notch (202) on the carrier tray (200), and the finger tab (304) is rotated downward by the actuator (305) into the notch (202). The telescoping members (301, 302) are then retracted back towards the T3V, causing the finger tab (304) on each arm to pull the target carrier tray (200) and case payload (401) in the same direction until, as shown in FIG. 4c, the payload is fully onboard and resting on the rollers on the payload-bay (110) floor. The transfer from the payload bay (110) onto a base platform occurs in the exact reverse sequence: the T3V positions itself in front of the empty space where the carrier tray is to be placed, adjusting the longitudinal position of the carrier tray as necessary (FIG. 4c), extends the telescoping members of both transfer arms with the active finger tabs still engaged in the notches, thereby pushing the carrier tray from the payload bay completely onto the base platform (FIG. 4b), rotates the active finger tabs upward into the passive vertical position, and retracts the telescoping members back to their normal nested position, leaving the carrier tray on the base platform (FIG. 4a).

Figure 5A:
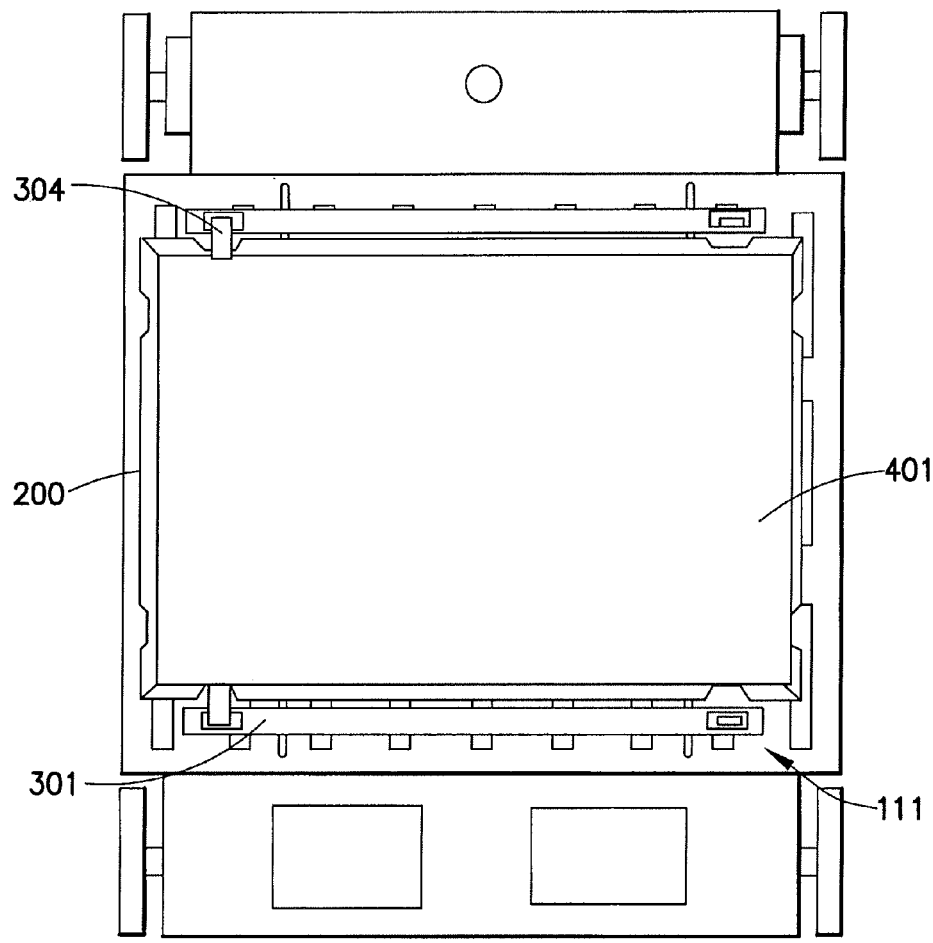
FIG. 5a and FIG. 5b show top and side views, respectively, of the autonomous transfer and transport vehicle with a payload onboard employed in the first embodiment of the invention.
Figure 5B:
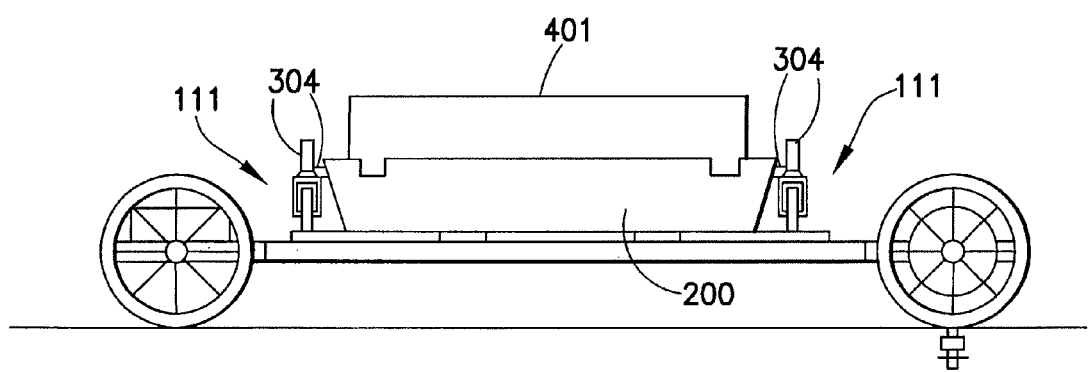

After a T3V has performed its transfer function to pull a payload onto its payload bay, it holds the payload in place while it performs its transport function of conveying the payload to wherever the case of merchandise needs to be taken. FIG. 5a and FIG. 5b show top and side views of the T3V with a payload onboard. The active finger tabs (304) remain engaged in their notches to prevent lateral movement of the carrier tray during T3V movement, and the transfer arms (111) themselves prevent longitudinal movement of the payload. By moving along the longitudinal track (127), the transfer arms (111) can also be used to adjust the position of the carrier tray on the payload bay. If necessary or desirable in an application, it is possible to increase the number of finger tabs used to engage a carrier tray, and/or incorporate other locking mechanisms, in order to increase the security of the hold of the payload on the T3V.

Figure 6:
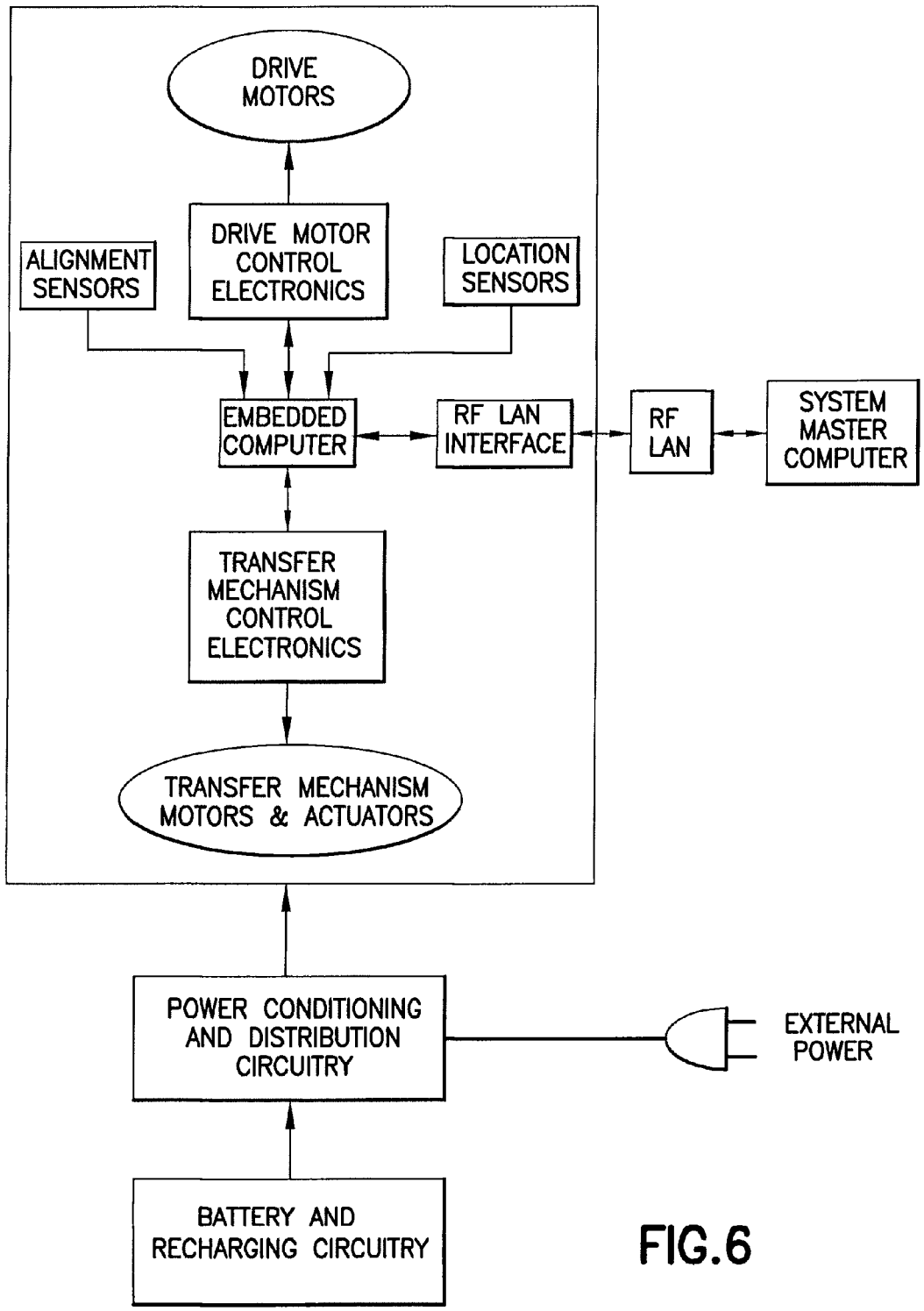
FIG. 6 is a topological block diagram of the computer and electronic and electrical subassemblies which may be employed to implement an autonomous transfer and transport vehicle.

The T3V is an electrically powered vehicle with a number of onboard electric motors and actuators, and includes a variety of electronic components used for control, sensing, and communication. FIG. 6 is a block diagram of the major electrical and electronic components of the T3V. The primary of these is the embedded control computer that manages all operation of the autonomous vehicle. This is a conventional microcomputer with a CPU, memory, software stored in memory (firmware), and a number of input/output ports. The control computer governs the operation of the drive motors (106, 107) and the motors and actuators in the transfer arms (111) by means of control electronics, and uses input from onboard sensors to control the interaction of the T3V with surrounding environment.

For example, location sensors are critical to enabling the T3V to determine its location with the work facility at any moment in time. The location sensors (128) are 1-D optical readers (with integrated light emitters) mounted on the bracket (119) of the pin-tip subassembly (117), one on each side, facing up towards the underside of the roadway (129) surface, where they can read location-encoded optical indicia placed on that underside surface. Continuous strips of optical indicia are installed along the entire guideway, one placed on each side of the slot at a point (130) on the underside surface, facing down to be read by the optical reader that is facing up, where they will be very well protected from dirt or other contamination that might interfere with readability. The strips have barcodes at intervals along the way, with additional interval markers between the barcodes, with each pair of strips along a length of guideway encoded identically. As the T3V moves along the guideway, the pin-tip assembly (117) passes underneath the optically-encoded strip and the optical readers (128) decode the barcodes and sense the optical interval markers between barcodes, inputting this data to the control computer. The barcoded data can contain location information directly or contain arbitrary values that are linked to a location map in a database. The optically-encoded location indicia can be used not only for purely navigational purposes, but also as operational aids to the control computer. For example, the firmware in the embedded control computer can use these indicia to identify the points within a fork where the various actions of the drive motors are required as described earlier.

Also essential are the alignment sensors that make possible the "hand-eye" coordination of the precise movements of the transfer mechanism in performing a transfer operation. Indeed, T3V, this analogy is rather literal, as the alignment sensors are simple miniature cameras (also with integrated light emitters). Two cameras are collocated with the finger-tab assembly (306) on each end of each transfer arm. One of the cameras in each pair faces in the direction of movement of the transfer arm and is used to align the arm with the edge of the target carrier tray, while the second camera faced towards the center of the T3V payload bay and is used to align the finger tab with the target notch in a target carrier tray. The operational performance of these sensors is also enhanced (and the design itself simplified) by placing reflective markers on the carrier trays themselves.

Additional sensors that can prove advantageous are those that provide status information to the embedded control computer about T3V components, such as drive-wheel RPM and pressure-sensor feedback from the finger tabs, and object-proximity detectors for fail-safe collision-avoidance.

In the preferred embodiments of the invention, the embedded control computer communicates with a system master-control computer by means of an onboard radio-frequency local-area network (RF LAN) interface, such as one based on IEEE 802.11b standards.

Operation of the electric motors and actuators, plus all of the electronics in the T3V obviously requires a source of electric power, as well as conditioning and distribution circuitry. There are basically two choices: electrifying the guideway and equipping the T3V with contact pick-ups, along the principles used to power electric trains, or use rechargeable batteries or capacitors for onboard energy storage, which is the simplest approach and for that reason the one used in embodiments of the invention. Of course, these choices are not mutually exclusive. For example, it may be advantageous to use rechargeable batteries or capacitors to avoid the expense and reliability issues involved with electrifying all guideways throughout the facility, but to electrify the guideways around workstations, where T3Vs must spend significant amounts of time moving slowly and queuing for transaction. In this way it would be possible for T3Vs to recharge their batteries without having to reduce duty cycle by taking themselves offline to go to a recharging station. Rapidly rechargeable capacitors may be used to store sufficient electrical energy to power the transfer and transport vehicle when it is enroute to and from electrical charging stations located at the positions where the transfer vehicle is receiving incoming cases or discharging outbound cases. Suitable capacitor power supplies using rapidly rechargeable double layer capacitors are described in U.S. Pat. Nos. 5,528,121, 5,783, 928 and 5,977,748 issued to Okamura (JEOL Ltd.). U.S. Pat. No. 6,651,759 issued to Gruenwald et al. describes a hybrid vehicle using a rechargeable battery as a power source for supplying motive power to the wheels. The disclosures of each of the foregoing patents are incorporated herein by reference.

Figure 7:
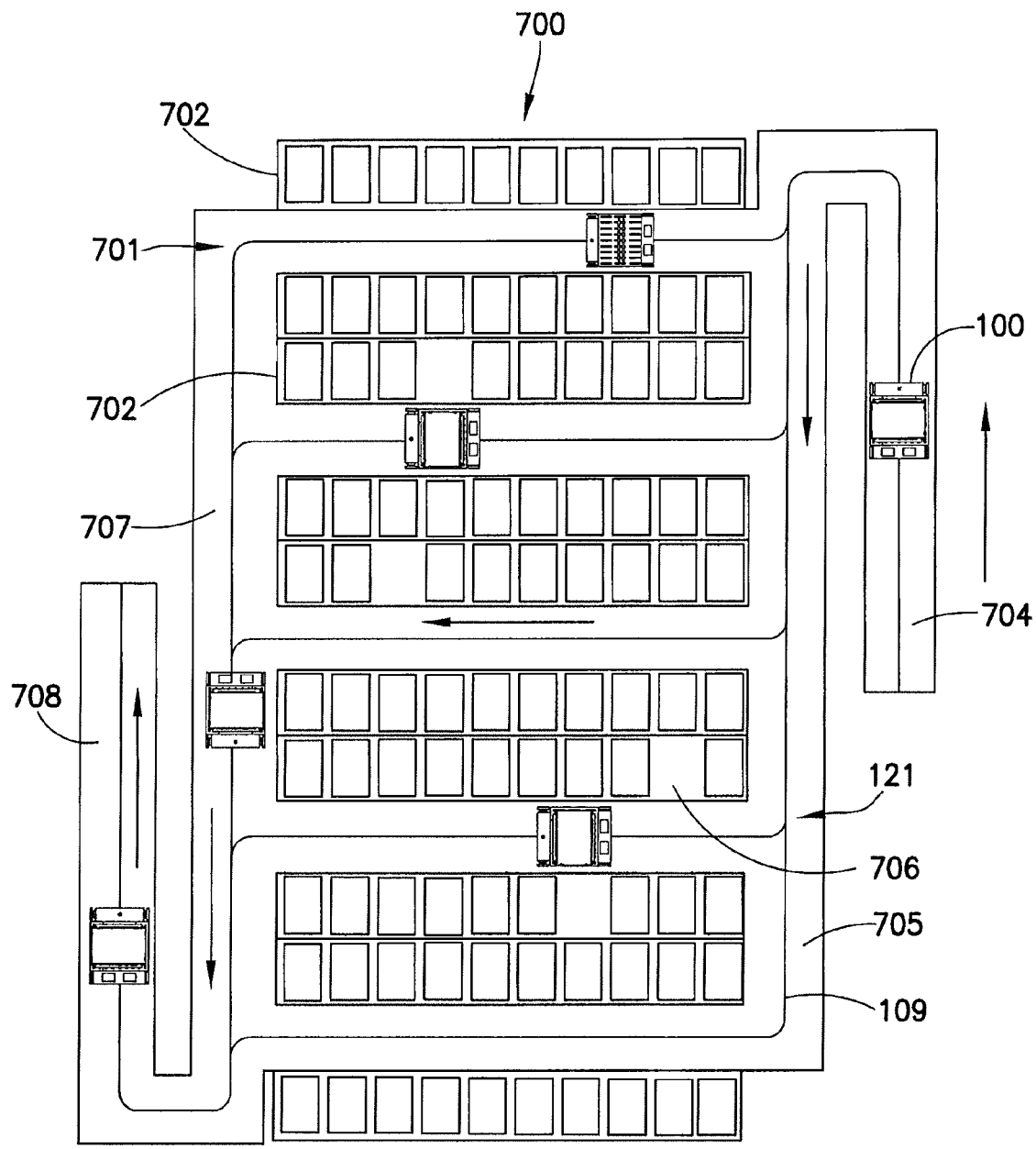
FIG. 7 is a top view of one level of the storage structure according to the first embodiment.
Figure 8:
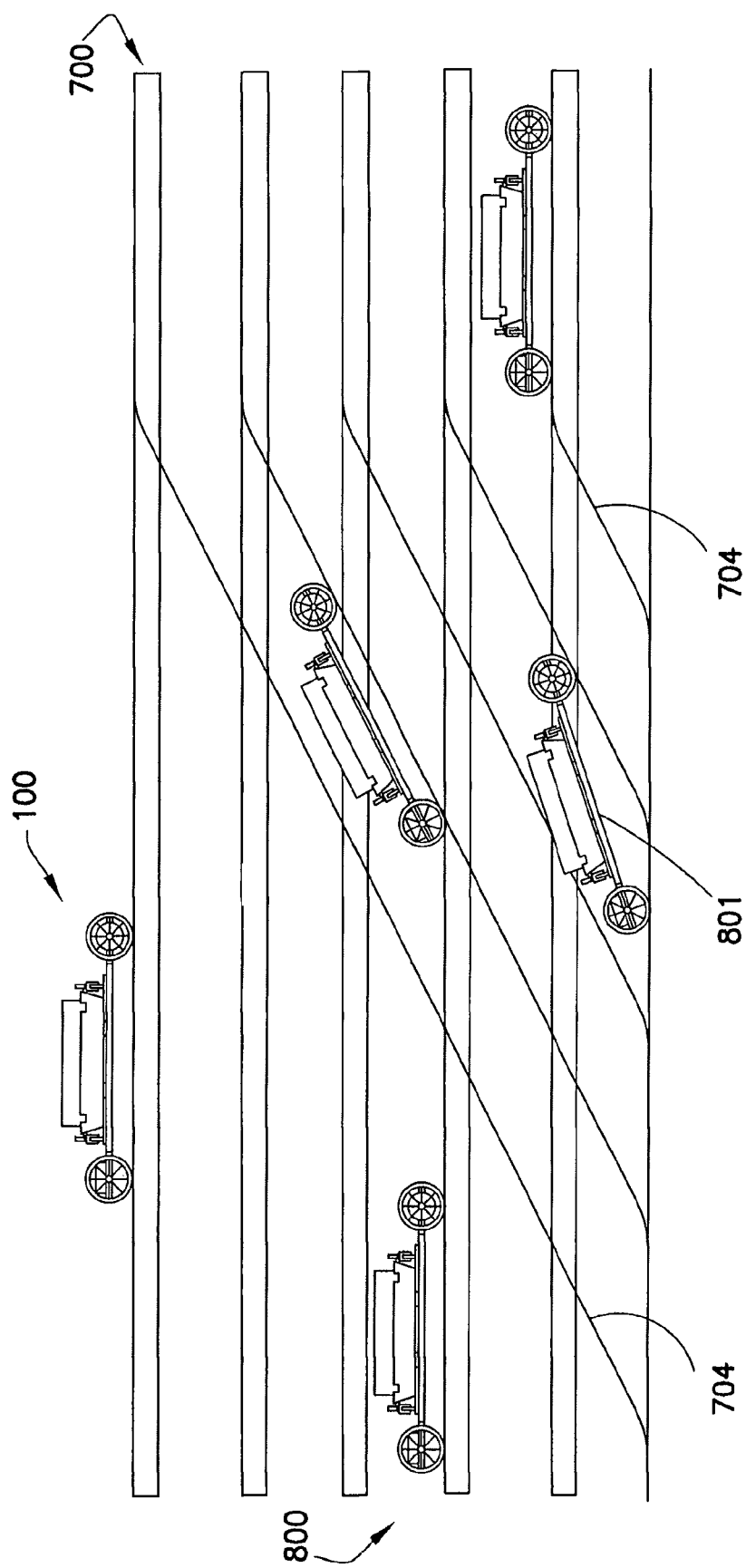
FIG. 8 is a partial side view of a storage structure according to the first embodiment.

An order-picking system will typically require a storage facility in which to place picking stock, i.e. the merchandise to be used in filling orders. In the present invention, this facility is a storage structure, typically having multiple levels, which essentially provides T3Vs random access to storage locations where carrier trays can be placed. FIG. 7 depicts a top view of a single level (700) of a storage structure, showing several T3Vs at work. Aisles (701) are formed by opposing rows of storage racks (702) separated by guideways within which T3Vs operate. A T3V travels up a guideway ramp (704) to reach the level (except for the ground-floor level, of course), travels down an entry guideway (705) to the specified aisle and turns through a fork (121) to enter the aisle, travels to the specified storage location (706), executes the specified transfer function either by pushing a carrier tray from its payload bay onto the storage rack (702) or pulling a carrier tray from the storage rack onto its payload bay, continues down the remaining length of the aisle, and turns onto an exit guideway (707) that leads down the exit ramp (708) back to ground level. To simplify traffic control and minimize opportunity for collisions, all travel is one-way. FIG. 8 shows a side view of a storage structure (800) with six levels (700), including the ground level, and the configuration of ramps (704) leading to each level (700).

In order to maximize storage density within the facility, the interval between two levels should be only high enough to allow clearance of the T3Vs operating on the lower level, as is drawn in FIG. 8. In that case, however, ramps to consecutive levels will not provide sufficient clearance for T3Vs to transition the change in pitch without hitting the next higher ramp if they are stacked directly above each other, as illustrated by the T3V (801) beginning the climb to level 3. The solution to this problem is to divide the set of ramps into two stacks, each consisting of ramps to alternate levels (one to odd-numbered levels and the other to even-numbered levels), and placing these two stacks side-by-side, as shown in FIG. 8, or one in front of the other.

Figure 9:
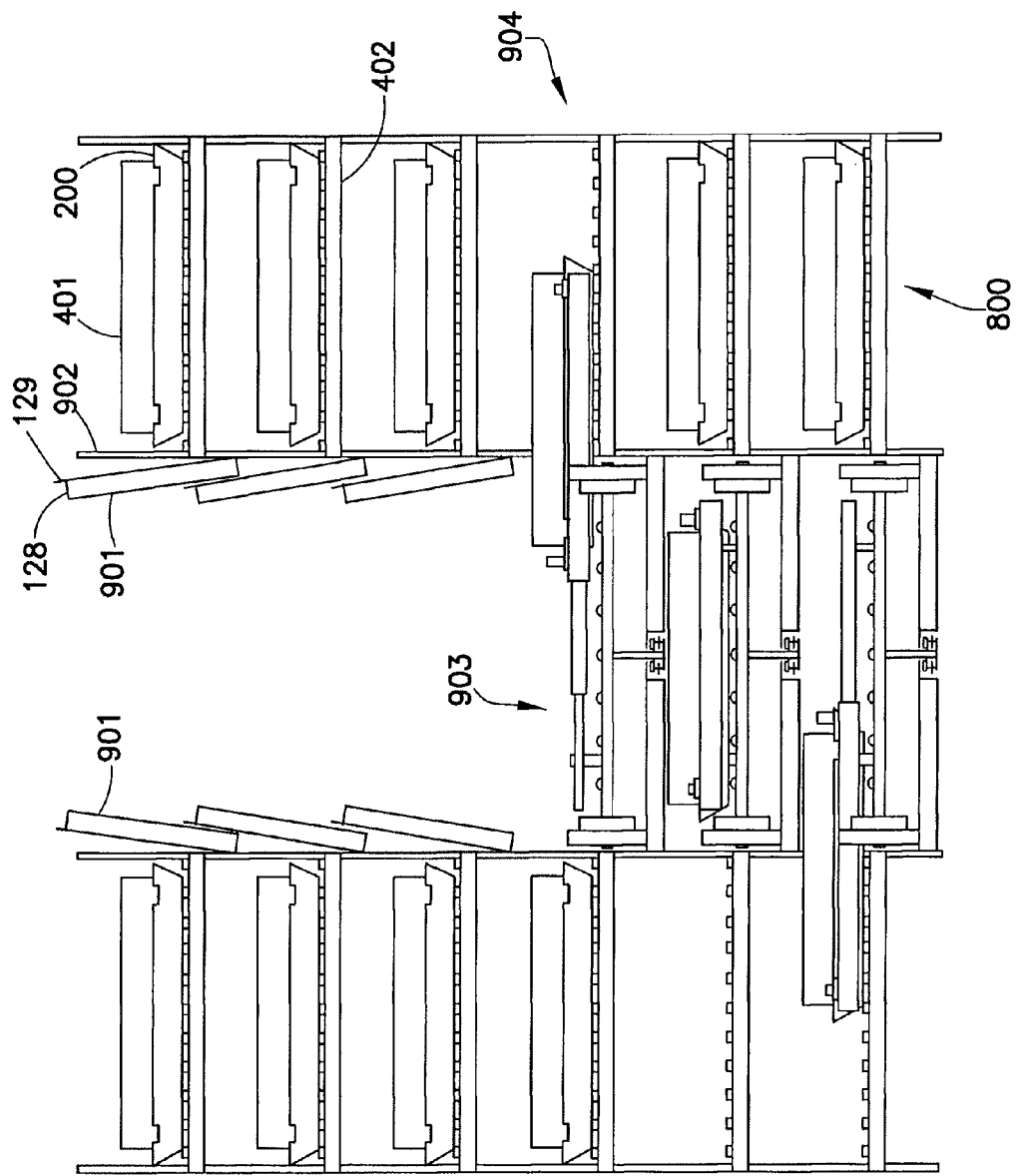
FIG. 9 is a cross-sectional view of a storage structure according to the first embodiment.
Figure 11:
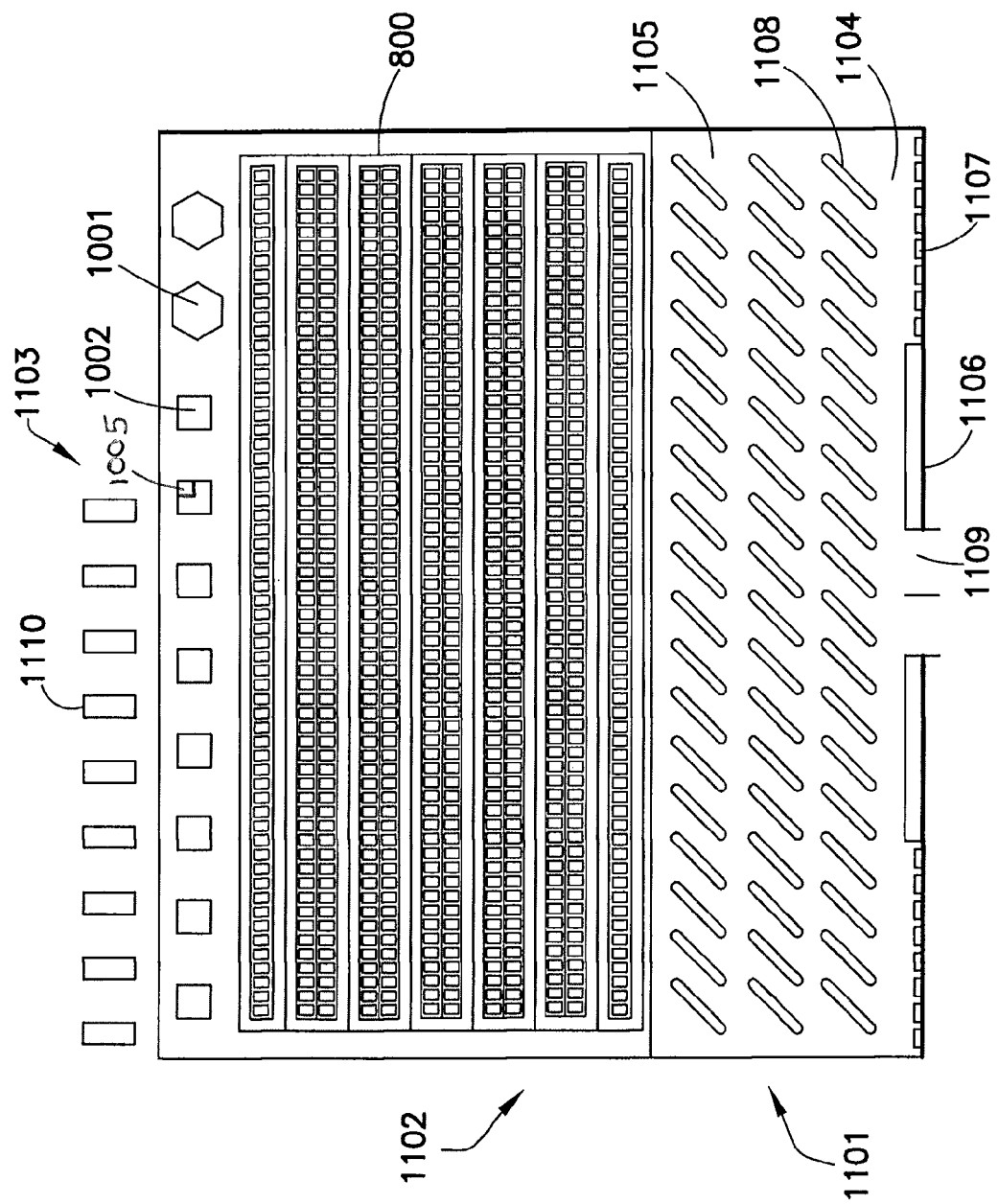
FIG. 11 is a simplified floor plan of an automated full-service retail store using the present invention.

One very practical problem that must be considered in the design of a high-density storage rack in which the interval between levels may only be 18 inches or less, is how to gain access to a T3V that has malfunctioned within the interior of a lower level, as the spaces would be too tight for even small people to service the failed T3V. The solution to this problem is illustrated in a cross-sectional view of a storage structure (800) shown in FIG. 9, with six levels (700). In this design, guideways are made up of pairs of panels (901) that are attached rotatably, as with a hinge, to the support frame (902) of the storage structure (800) such that they can be opened up from above, as shown. Furthermore, all levels have identical layouts and are aligned vertically so that each aisle on a lower level is directly beneath the corresponding aisles on all higher levels. With this design, then, access to a failed T3V is gained from above by rotating open the guideway panels directly above the failed T3V one after another from the top level down. For example, as depicted in FIG. 11, suppose that the T3V (903) on the third level (904) of the six-level storage structure has failed in the middle of a transfer. The problem would be corrected by opening the guideway panels on the top level (sixth level) immediately above the failed T3V, then the corresponding guideway panels on the next two levels down to expose the problem T3V (903) so that corrective action can be taken through manual intervention. Once the problem has been corrected, the guideway panels (901) are returned to normal horizontal position in the reverse order and normal operations are resumed. During this entire procedure, operations must be suspended only within the one affected aisle on each of the affected levels. As shown in FIG. 9, T3Vs can continue to operate on the same aisle on lower levels, and also on all other aisles on all levels within the structure.

In some applications, the merchandise to be stored in the storage structure will include frozen and refrigerated products that require lower-than-ambient temperature control. To meet that requirement, the storage structure can be designed to permit sections to be lined with thermally insulating panels that isolate the air mass with those sections, thereby permitting efficient cooling of that air, with air curtains or plastic-strip curtains that permit T3Vs to enter and exit aisles within the refrigerated or frozen sections while preventing significant loss of cooled air.

As has been noted, the operation of all T3Vs within a work facility is controlled by a system master computer, which communicates with individual T3Vs via an RF-LAN. The system master computer performs a number of executive processes within a given application, but the two processes that directly affect the T3Vs are task scheduling and traffic control. The task-scheduling function takes as input a stream of tasks that need to be performed by T3Vs within a rolling window of time into the future, and a fleet of operational T3Vs available to perform those tasks, and produces a rolling schedule specifying which tasks are to be performed by which T3Vs at what times. A simple example of a scheduled task for a given T3V might be: go to location A to arrive by time X, transfer carrier tray from base platform on right side of vehicle onto payload bay, take payload to location B to arrive by time Y, and transfer onto base platform to left of vehicle. (The task-scheduling software is responsible for managing the entire fleet of operational T3Vs, so that any time a there is idle T3V capacity, i.e., fewer T3Vs needed to perform tasks than are available, the task-scheduler will create a "park and wait for further instructions" task.)

The scheduled tasks that are output by the task-scheduling process on the system master computer are then input to the traffic-control process, which performs a function very similar to what air-traffic controllers do in the system of air travel. The traffic-control function decomposes each scheduled task into a series of very specific routing instructions, or "vectors", that ensure that the task is accomplished successfully while avoiding collision with any other T3V. For example, the traffic-control process would instruct the T3V, starting from a specified location at a specified time, to accelerate at a specified rate to a specified speed, maintain that speed for a specified time in order to arrive at a second specified location at a second specified time, decelerate at a specified rate to a lower specified speed, execute a turn at a specified fork to change to a different guideway, etc. These instructions are transmitted to the T3V over the RF-LAN, along with a time-synchronization signal to ensure the T3V operates on the same timebase as the system master computer. At this point, the T3V assumes responsibility for executing those routing instructions precisely as given. The T3V also reports back in to the traffic-control process as each routing instruction is performed to provide a feedback loop, in effect permitting the traffic-control process to create a virtual "radar screen" of all T3V activity and ensure that operations are going as planned. Of course, when unexpected events occur and operations don't go as planned, both of these processes must have robust problem-solving logic to try to stabilize operations, which would include raising alerts and/or alarms to human supervisory staff to take action.

Note that this recommended software architecture is only one possible approach to solving the general management-and-control problem inherent in a large-scale parallel system such as this. It has the advantage of running the most complex software processes in the system master computer, which can be a very powerful server-class machine, rather than in the T3Vs embedded control computer, thereby minimizing the amount of computational power—and thus the cost—required in the T3V itself. Those skilled in the art, however, will recognize that other methods and embodiments are readily possible.

Applications

Figure 10:
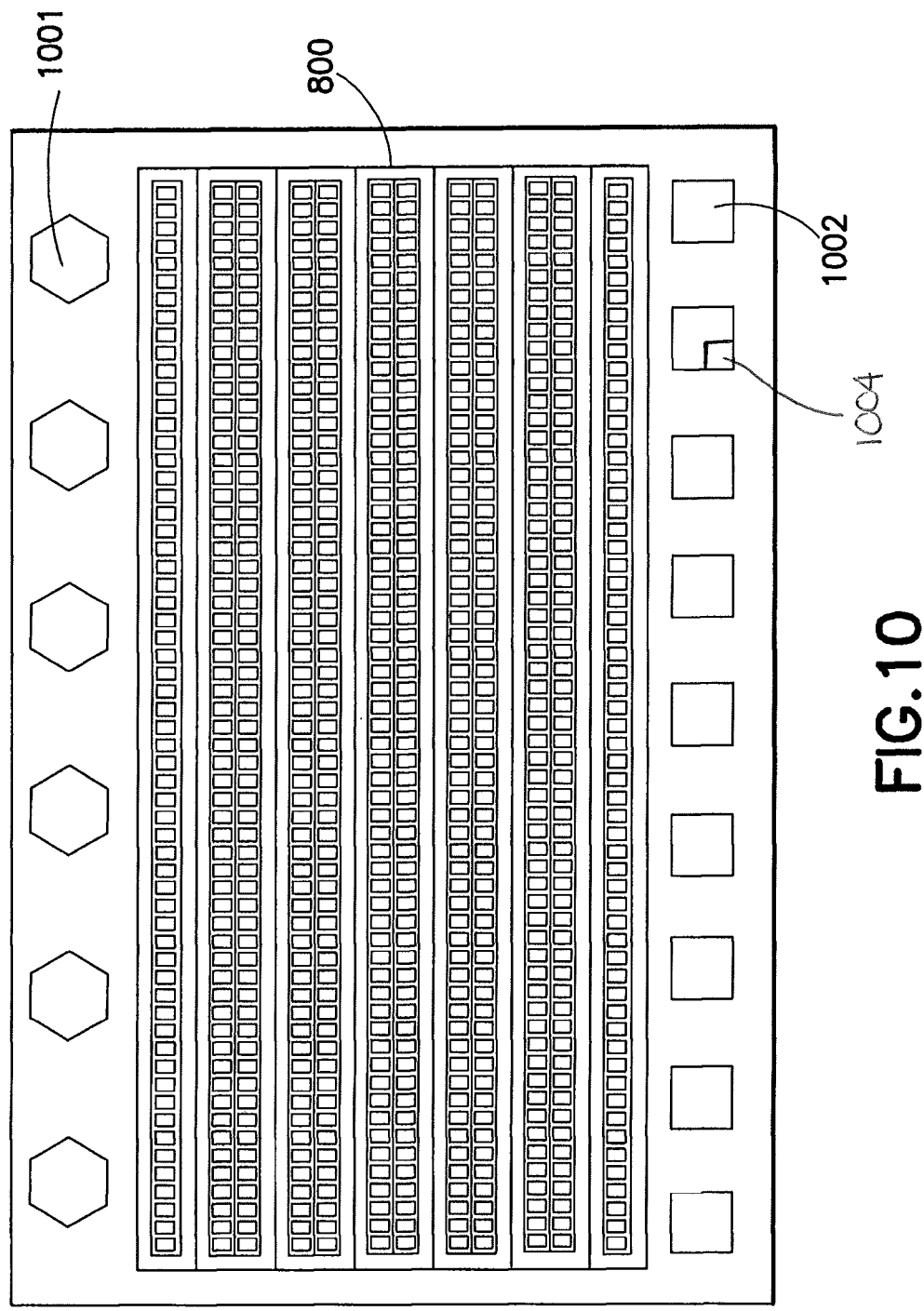
FIG. 10 is a simplified floor plan of an order-picking facility using the first embodiment of the present invention.

As mentioned earlier, the principles of the invention may be applied to solve the general problem of automating order-picking by making possible a highly efficient goods-to-man operating model in the short term and a goods-to-robot model in the longer term. To show how this solution works in practice, FIG. 10 shows a simplified example of a floor plan of an order-picking facility using the present invention, illustrating both a retail distribution center where orders are picked at case level and an item-level order fulfillment center.

In a retail DC using the present invention, the order picking process begins at depalletization workstations (1001) with the removal of cases from single-product pallets received from suppliers, either immediately upon arrival or after having been placed into temporary storage. At each workstation, cases are taken off the pallet either manually or preferably by completely automated depalletizing robots or special-purpose machines that are commercially available at present, and sent down a conveyor. In the first embodiment of the present invention, which uses carrier trays to hold the cases, the next step within each workstation is the insertion of the singulated cases into the carrier trays, either by manual or preferably automated means. In the second embodiment, the cases themselves are placed on an input conveyor. The output of each depalletizing workstation, then, is a stream of carrier trays, each holding a single case of merchandise, or stream of single cases without trays. As instructed by the system master computer, more specifically by the task-scheduling and traffic-control processes running on that computer, the transport vehicles then come to a pick-up point, transfer the carrier trays or cases one at a time onto their payload bays, and (typically) transport each case into the storage structure (800) to a specified empty storage location and transfer the carrier tray holding a case, or a case itself, onto the storage rack. Then, again as instructed by the system master-control computer as required for the building of outbound mixed pallets, transport vehicles go to specified locations in the storage structure (800), transfer specified carrier trays or cases at those locations from the storage racks onto their payload bay, transport these carrier trays or to specified order-assembly pickup point (1002) which, in the case of the first embodiment is an order assembly workstations and, in the case of the second embodiment, is a vertical conveyer which transports the case from the vehicle to an output conveyor which delivers the case to the order assembly workstation, where mixed pallets (1004) are built. At each order-assembly pick up point (1002), the transport vehicles transfer their carrier trays or cases onto a conveyor (horizontal or vertical) which moves the cases to the output order-assembly workstation where the cases are placed on an outbound mixed pallet (1004), either by manual or preferably by automated means. The carrier trays used in the first embodiment are then recycled for re-use. (It should be noted that, instead of transporting a case of merchandise into the storage structure to be retrieved on a subsequent transaction, a transport vehicle can "cross-dock" it, i.e. transport it directly to a pallet-building workstation to be used immediately, thereby effectively saving most of an entire round-trip transaction. Because this the most efficient use of T3V resources, the system master-control computer generally tries to schedule depalletization and palletization activities to maximize opportunities to cross-dock.)

In an item-level order-fulfillment center using the present invention, the order picking process is very similar to the case-level process described above. In fact, there are only two significant differences: an additional step at the depalletization station is the removal of the case top to expose individual item units for picking, and cases are returned to the storage structure after each item pick unless empty. Thus, referring again to FIG. 10, the order picking process begins at depalletization workstations (1001) with the removal of cases from single-product pallets received from suppliers, either immediately upon arrival or after having been placed into temporary storage. At each workstation, the singulated cases immediately have their tops removed. Automated top-removal machines are commercially available that remove the top from a cardboard case while it travels down a conveyor by first passing it through a light-curtain to measure the case's dimensions and then passing it through cutting blades precisely positioned based on the measured dimensions to cut the case material along all four sides of the box, after which a suction mechanism adheres to the top and pulls it away. With their tops off to expose individual item units for picking, the cases are then inserted into carrier trays in the first embodiment, or transported without trays in the second embodiment, either by manual or preferably automated means. The output of each depalletizing workstation (1001), then, is a stream of carrier trays each holding a single open-top case of merchandise, or a stream of open-top cases without trays. As instructed by the system master computer, more specifically by the task-scheduling and traffic-control processes running on that computer, the wheeled vehicles then come to a pick-up point at the conveyer (vertical or horizontal) from the depalletization station (1001), transfer the cases or carrier trays one at a time onto their payload bays, and then transport each case into the storage structure (800) to a specified empty storage location and transfer the case or carrier tray onto the storage rack. Then, again as instructed by the system master-control computer as required for the picking of items to fill orders, the wheeled transport vehicles go to specified locations in the storage structure, transfer specified carrier trays at those locations from the storage racks onto their payload bay, and transport these carrier trays to vertical and/or horizontal conveyers at the order-assembly workstations (1002). In an item-level order-fulfillment center, order assembly involves a pick-and-pack process in which a specified number of items are removed from the case and placed in an outbound shipping container (1005) such as a box or tote. If there are any items remaining in the case after the pick is complete the partially filled case is returned to a specified location in the storage structure (usually but not necessarily the original location). In the first embodiment, the T3V is instructed to drop off the carrier tray at a recycling station where the empty case is discarded and the carrier tray recycled for re-use. In the second embodiment, the empty case is discarded at the order-assembly workstation. Outbound shipping containers once filled will typically be to placed in carrier trays and transported by a transport vehicle, or placed on a conveyor, for transport to final shipping stations.

At the time of this writing, there are very few commercially available robots or special-purpose machines that can be used to automate the order-assembly process at the case level, and none at the item level, though this is likely due to the lack of demand and that situation can be expected to change if the present invention becomes widely used. However, even if the order-assembly process is performed manually, the present invention results in a very large increase in productivity-on the order of four or five times-compared conventional man-to-goods methods today. Indeed, with the present invention it is possible for a single human operator to fulfill item-level orders at a rate of 1,000 item-picks per person-hour, so that only five operators can pick as many items—5,000 or so per hour—as are purchased in a retail store at peak volume.

The present invention, then, makes possible a new operating model for a retail store far different than the conventional self-service store: the automated full-service store, in which customers shop by ordering items with an electronic shopping terminal instead of collecting them in shopping carts, and the orders are then picked in real time and delivered to pick-up bays for the customers to pick up as they leave the store.

FIG. 11 a simplified floor plan illustrative of an automated full-service store based on the present invention. The store is divided into two major sections, a shopping section (1101) where customers select the items they wish to purchase, and an order-fulfillment section (1102), and an order pick-up area (1103) is located outside the store.

The order fulfillment section (1102) is essentially a smaller-scale version of the item-level order-fulfillment center described above. Cases of merchandise arrive at the store on mixed-product pallets shipped from a distribution center and are processed at a depalletizing station (1001) in exactly the same way as described above: cases are transferred from the pallet to a conveyor, have their tops removed, and may be inserted into carrier trays, picked up by transport vehicles, transported into the storage structure (800), and transferred onto a storage rack. As required to fill customer orders, the transport vehicles also retrieve cases containing ordered items from the storage structure, transport them to order-assembly stations (1002) where the ordered number of items are removed from each case and placed into a shopping bag (or equivalent container), and then either returned to the storage structure (800) or the empty cases are discarded (or potentially used as outgoing containers for ordered item units). In the automated store, the shopping bags are preferably self-supporting, may be placed in carrier trays, are transported to the order-assembly stations by wheeled vehicles or by conveyors, and when filled at the order assembly station are transported by conveyors or T3Vs to pick-up bays.

The shopping section includes a lobby area (1104) and a product-display area (1105). In the lobby (1104), preferably along a wall to save floor space, are bank shopping terminals (1106), and a number of automated checkout stations (1107).

The shopper goes through the entry way (1109) into the store lobby (1104), picks up a shopping terminal, and then shops in the product-display area, where item units are placed on display fixtures (1108) for examination and evaluation only. Typically, there is only one display unit per product, though retailers may add additional facings of certain products for promotional emphasis or to reduce contention for high-volume items. The shopper handles display units for informational purposes in order to make purchase decisions, but then returns them to their places on the display fixtures. The actual order is created by scanning the UPC barcodes printed on display-item packages and on their shelf labels. (Note that other machine-readable identifiers could be used, such as RFID tags or touch-memory buttons, but optically scanned UPC barcodes are normally preferred for reasons of simplicity and low cost.)

In the automated store, the shopping terminal is essentially a mobile battery-powered computer consisting of a CPU, memory, a wireless network interface (such as 802.11b), a barcode scanner, and a user interface consisting of a screen that displays information to the user, buttons and/or a transparent touch-screen overlay that accept touch-input from the user. The software on the scanner includes an operating system (such as Linux), a browser (such as Opera), and device drivers. Application-server software running on the system master computer produces the information to be displayed on the screen. The browser on the shopping terminal controls the interactive exchange of information between the terminal and the application-server software and displays server-provided information on the terminal's screen. Stored in the memory of each shopping terminal is a unique identifier that's used to identify the terminal (and therefore the shopper) to the application-server software. Two examples of existing commercially available hand-held devices that could be used as the shopping terminal are the PPT2800 and the PDT7200 from Symbol Technologies, Inc.

When a customer scans a UPC to order an item, the application-server software first checks the on-hand availability of that item. If there is an unreserved unit of the item in the order-fulfillment section, the application-server software reserves it for the shopper and transmits back to the terminal's browser a screen update showing the item's description, its price, and the new order total including the item. On the other hand, if there is no unreserved unit of the item in the order-fulfillment section, the application-server software transmits back an out-of-stock advisory so the shopper can immediately make an alternate selection. At any time during the shopping trip, the customer can cause the terminal to display a list of the customer's order showing a description of each item ordered and its cost, and the total cost of the complete order. Typically items can be added to the list by scanning product UPCs as described above, or by viewing descriptions of products on hand on the browser screen, and selecting one of the displayed items for purchase. At any time during the shopping process, the number of units of any item already on the list can be easily changed using the touch screen interface and/or the buttons on the front of the terminal. For example, the customer might scroll up or down the list and select an item, and then change the order by incrementing or decrementing the number of ordered units for that item. (Also, once an item has been added to the order list, each subsequent scan of the item's UPC barcode increments the number of units that item in the order, e.g., scanning an item's barcode three times is an order for three units of that item.) With each increment of the number of units of an item order, the computer follows the same procedure described above: it checks available stock, reserves an item unit if available, and updates the terminal's screen to show the order with the additional item unit or an out-of-stock advisory. With each decrement of the number of units of an item order, the central computer updates the terminal's screen to reflect the removal of the item unit, and also removes the "reservation" previously placed on that item unit in the picking stock, freeing it to be ordered by another customer. (If the number of units for an item ordered by a customer is reduced to zero, the item description is not removed from the order list but continues to be displayed with a zero unit count. Decrementing the item order further will have no effect, but the customer can increase the item order again through the screen/button interface without having to physically return to the item's shelf location.)

Once the shopping trip is complete, the shopper proceeds to an available checkout station (1107) located in the lobby. Resembling an ATM at a bank, each checkout station (1107) is itself a computer with a CPU, memory, network interface (wireless or wired), and an array of peripheral devices that include a coupon capture device, a cash exchanger, a magnetic card swipe, a printer, and a touch-sensitive screen. Each checkout station also has an identifying barcode located prominently on its face, and the customer initiates the checkout procedure by scanning this barcode with the shopping terminal, which activates the checkout station and deactivates the shopping terminal. After making any last-minute quantity changes, the customer commits the contents of the order and makes payment using coupons, cash, and/or electronic funds transfer. By installing an abundance of checkout machines, the retailer can effectively eliminate the need for any customer to waiting in line at checkout.

In general, the system master computer waits until the customer has committed the order before beginning the order-picking process described above so that the customer can change the quantity of any ordered item at any time without cost to the retailer. If a customer changes the quantity of an ordered item after it has been picked, a second transaction will be required—either a duplicate pick or a "reverse pick" in which the item is removed from the bag and placed back into the case. Another advantage of waiting until order confirmation is that the software on the system master computer can better optimize the distribution and combinations of items among multiple bags if the total set of items is known. During peak period of demand, however, it may be necessary to pick parts of some orders prior to final confirmation in order to maximize utilization of T3Vs and maintain acceptable service levels.

Once payment is complete, the checkout station (1107) prints out a paper receipt that includes a barcoded identification number. The screen displays a message which thanks the customer for shopping at the store, requests return of the shopping terminal, and advises the customer of the approximate length of time before the order will be ready for pickup. The customer then returns the terminal to the bank of shopping terminals, proceeds to his or her car, and drives to the pickup area (1103). At the pickup area (1103), a sign directs the customer to a specific pick-up bay (1109), where the customer's order will have been delivered by T3Vs. The barcode on the receipt is scanned for validation, and the order is then released for loading into the customer's car, either by the customer or by a store associate.

Alternatively, the customer can "shop at home" or even using a mobile communications device, such as a laptop or cell phone, and software (e.g., a web browser) for accessing the store's server in order to display descriptions of available products, select the items desired, specify the quantity of each to be purchased, and further specify whether the order is to be picked up or delivered to the customer. Items ordered online are simply reserved for the customer, and the automated order picking process is delayed until the customer arrives at the store to pick it up or until it is time to deliver the order to the customer.

Design Detail of the Preferred Embodiment

In the preferred embodiment of the present invention, a materials-handling system designed to pick orders uses autonomous vehicles to directly handle cases of merchandise and perform the functions of both transferring cases into and out of storage locations (e.g., a shelf) and transporting the cases within the work facility. A multi-level storage structure holds the cases of merchandise that are the picking stock available to fill orders. Each level of this structure has multiple picking aisles consisting of opposing storage racks holding the cases of picking stock, each pair of storage racks being separated by a travel lane through which the autonomous vehicles travel. Each picking lane on a given level is conjoined at both ends with interchange decks that provide bots access to any of those lanes, and the levels are interconnected by ramps or vertical lifts that provide bots access to any level in the storage structure. Each bot therefore has access to all picking lanes, storage racks, and cases of merchandise in the storage structure (subject to aisle-width and height restrictions if bots vary in size).

Like the first embodiment, the preferred embodiment of the invention features the optional but beneficially simplifying use of track guidance. However, track guidance can take a variety of forms, of course, and in the preferred embodiment two forms are used. In picking aisles, here turns are unnecessary, simple rails are used: the wheels of the vehicle ride on straight, flat rails attached or integrated with the shelf-support beams, and beams themselves constrain the motion of the vehicle by engaging guidewheels (1300) mounted at the four corners of the vehicle. In interconnect lanes, however, where bots must be able to make turns, track-guidance is in the form of a slotted "guideway", as used in the first embodiment of the invention.

Vertical movement of cases into and out of picking stock is performed most advantageously in the preferred embodiment by multilevel, continuous vertical conveyors, as described herein. It should be noted, though, that in an alternative embodiment, vertical movement of picking stock could be performed by bots themselves traveling up and down ramps since all vehicles have random access to any picking lane.

Referring now to the figures, the system architecture in this second embodiment of the invention enable a highly efficient process model for a retail DC, illustrated in FIG. 12a, in which the cases of merchandise to be placed into picking stock are removed from the pallets received from the manufacturers by a depalletizer (1200), the individual cases are conveyed to input vertical conveyors that carry them vertically to a transfer station at a specified level in the storage structure. The cases are then picked up by bots (1203) and transported to a storage location (1204). Then, as required to fill an order, bots selectively retrieve cases from storage locations and transport them to transfer stations (1205), from which where they are subsequently conveyed vertically (1206) down to pallet-building workstations (1207). The cases are then conveyed to stationary pallet-building workstations where they are placed onto pallets for eventual delivery to stores.

A very similar operating model is used for item-level picking in an "e-commerce" order-fulfillment center or small-store distribution center, as illustrated in FIG. 12b. In FIG. 12b, steps that correspond to steps shown in FIG. 12a are designated with the same reference numerals. Cases are depalletized by a depalletizer (1200) and then have their tops removed by a case-top remover (1202) to expose the individual item units for picking. These open cases are then conveyed to input vertical conveyors (1201) that carry them vertically up to a transfer station at a specified level in the storage structure. The cases are then picked up by bots (1205) and transported to a storage location (1204), which is a section of corrugated shelf as explained more fully below. Then, as required to fill an order, bots selectively retrieve cases from storage locations (1205), and transport them to transfer stations, from which they are conveyed vertically (1206) down to container-packing workstations (1208), where individual item units are removed from their cases and placed into containers (totes, boxes, bags, etc.) for delivery to the end user. Unless empty, the cases are then returned by bots to storage. At the current time, the actual picking of the item is beyond the capabilities of affordable robots and must be performed by humans.

Just as with the first embodiment of the invention, the item-picking operating model using the preferred embodiment of the invention can advantageously be applied to a retail store as described in detail above, thereby automating the order-fulfillment process that the customer must perform in the self-service retail model.

Figure 13:
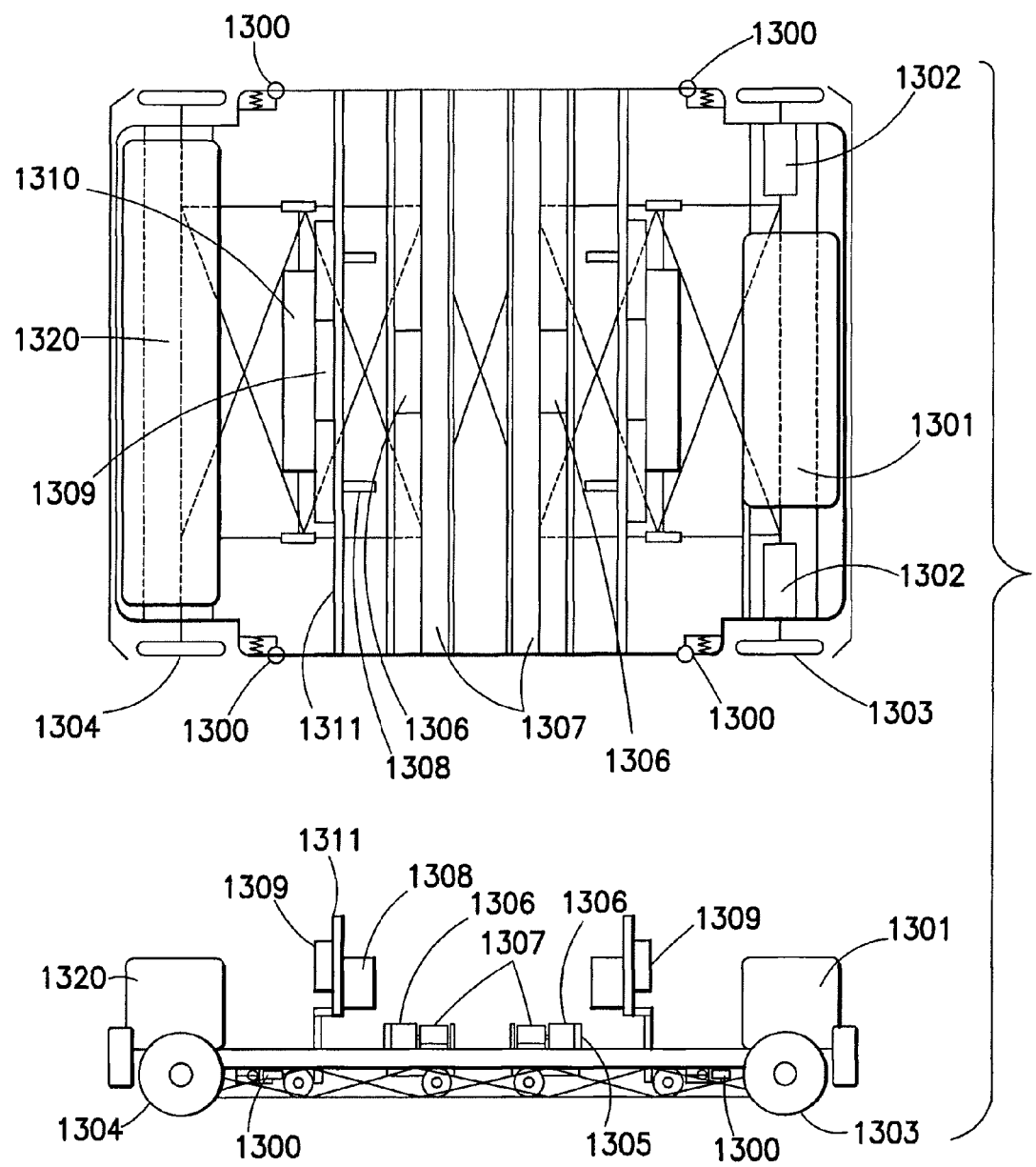
FIG. 13 shows cross-sectional and plan views of the preferred embodiment of the autonomous track-guided transfer and transport vehicle.

The preferred embodiment of the bot is depicted in FIG. 13, which shows both side elevation and plan views. The vehicle has a chassis frame, to which are attached the following major functional elements:

(a) four wheels, consisting of two rear drive wheels (1303) and two front running wheels (1304) that are also mounted on a ball-joint on which they can rotate in the direction of a turn;

(b) two drive motors (1302), one driving each of the two rear drive wheels (1303), that propel the vehicle, stop the vehicle through regenerative braking, and steer the vehicle through differential rotation;

(c) a guide-pin assembly at the front of the vehicle that engages the slot (109) in each guideway (1600) traveled and controls direction of vehicular movement;

(d) two transfer-arm (1307) assemblies that effect the transfer of cases between the vehicle and stationary locations (storage racks and transfer stations);

(e) two gripper-arm assemblies (1310) that engage cases on the vehicle and secure them for travel;

(f) an electronics module containing an embedded control computer (1320) and related interface circuitry, including a wireless local-area network interface by which the embedded computer communicates with a system master computer;

(g) sensors that provide information to the control computer, especially about the external environment, such as for reading location markers or aligning the transfer arms with a target shelf location in preparation for a payload transfer; and (h) a rechargeable battery (1301) and related power-conditioning and distribution circuitry, along with connection to external power.

Most of the space between the front and rear wheels is the payload bay in which one or more cases are held when being transported by the bot. Operating within the payload bay are two sets of subassemblies: a set of two transfer arm assemblies (1307) that operate together to transfer cases in the acquisition and discharge of a payload, and set of two gripper-arm subassemblies (1310) that secure the cases and prevent them from shifting during travel.

Figure 14:
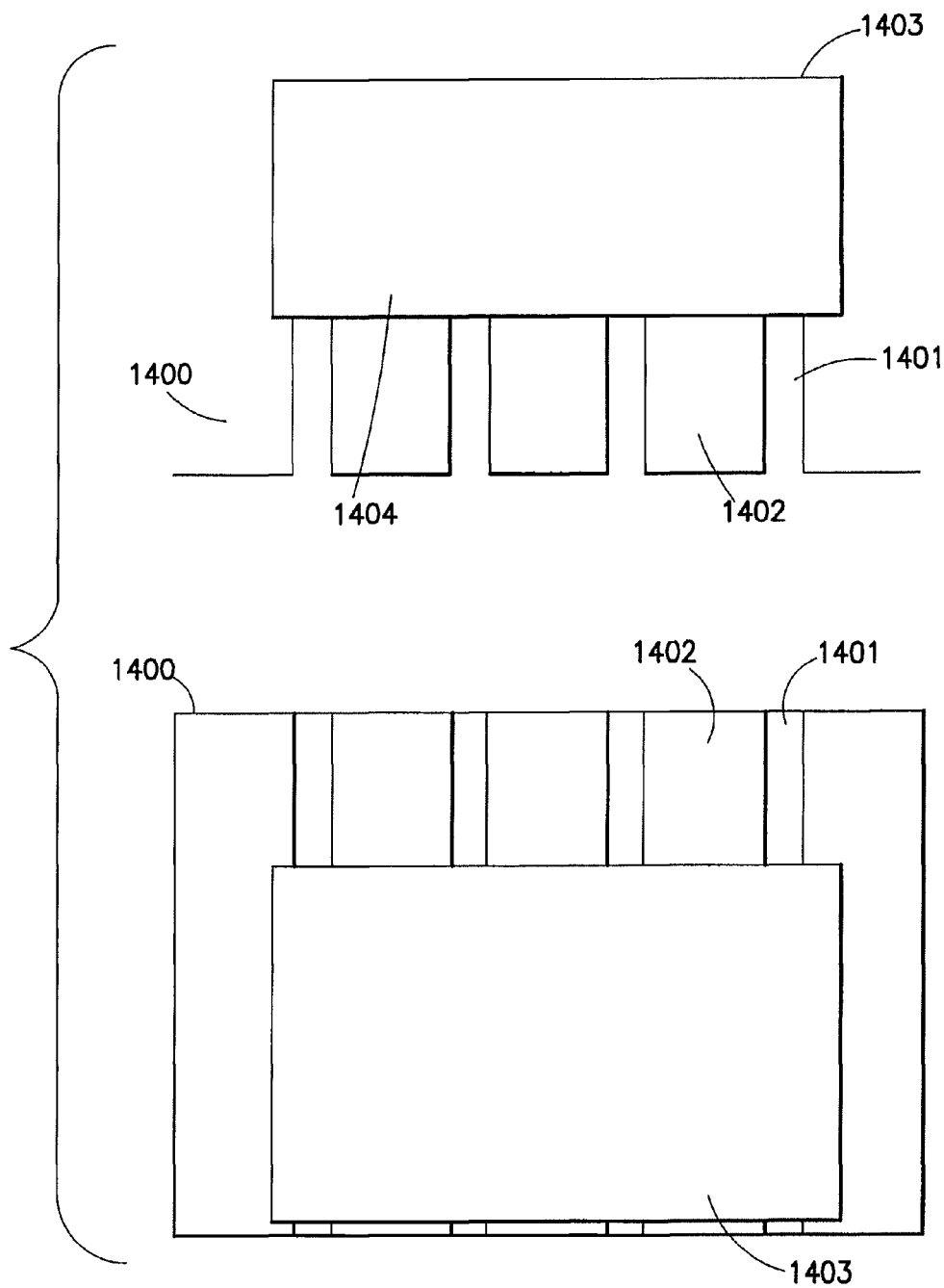
FIG. 14 shows cross-sectional and plan views of a portion of corrugated storage shelf according to the preferred embodiment of the invention.

The design of the transfer mechanism is one of the significant differences between the first and second embodiments of the invention. Instead of using trays to hold the cases of merchandise, the preferred embodiment handles the cases directly. This approach has three significant advantages over the use of trays: storage densities and shelf-utilization percentages are significantly increased through elimination of space wasted because of the trays; fewer transactions are required and therefore fewer bots are needed because bots can handle multiple cases at a time; and the elimination of the insertion and removal of the cases into and out of the trays simplifies the entire order-fulfillment process. Instead of using trays to provide a standard mechanical interface between the bot's transfer mechanism and the case payload, the preferred embodiment takes advantage of the fact that virtually all cases of merchandise, regardless of their dimensions or weight, have a flat bottom in order to be conveyable by roller conveyors. The flat bottoms of the cases themselves thus effectively provide a standard mechanical interface to the bot's transfer mechanism, the design of which is premised on the use of a shelf that supports cases in storage in such a way as to provide access to the bottoms of the cases resting on the shelf. An example of such a shelf is one that uses a corrugated panel to support cases at rest. As shown in FIG. 14, the corrugated shelf is characterized by alternating ridges (1401) and channels (1402) that are perpendicular to the picking lane, such that the support surface of the shelf, on which each case payload (1403) rests, is not a contiguous plane but is formed by the tops of the ridges (1401), each of which is separated by a channel (1402). It will be feasible to lift any case from its bottom using a minimum of two rising support surfaces to apply a vertical force to the bottom surface (1404) of the case. The corrugated shelf (1400), then, provides a resting surface for cases (1403) on the ridges (1401), while also leaving the bottom (1404) of the cases exposed over the channels (1402). This design makes it possible for a pair of vertically-expandable transfer arms (1307) to acquire a payload by passing underneath one or more cases in a collapsed (lowered) state, expand themselves vertically to lift the case off of the corrugated shelf, and then retract back onto the bot, carrying the case(s) with them. Offloading a payload is simply the reverse process: starting out supporting one or more cases in a vertically-expanded state, the transfer arms extend the required distance into channels within the corrugated shelf and then collapse, depositing the case(s) onto the ridges of the corrugated shelf. The arms then retract back onto the payload bay of the bot. Note that the case payload can consist of a single case (as shown in FIG. 14), or multiple cases.

The two transfer arm assemblies (1307) operate as a pair. Each assembly moves longitudinally front/back within the payload bay by means of longitudinal drive motors (1306) so that each arm can be aligned with a desired channel (1402) of the corrugated shelf (1400), and each arm can then extend by means of extension motors into that channel to a desired distance using both measured distance and input of sensors (e.g., an optical sensor that detects the edges of cases), and elevate and collapse as described above by means of lift motors within each arm assembly.

Figure 15:
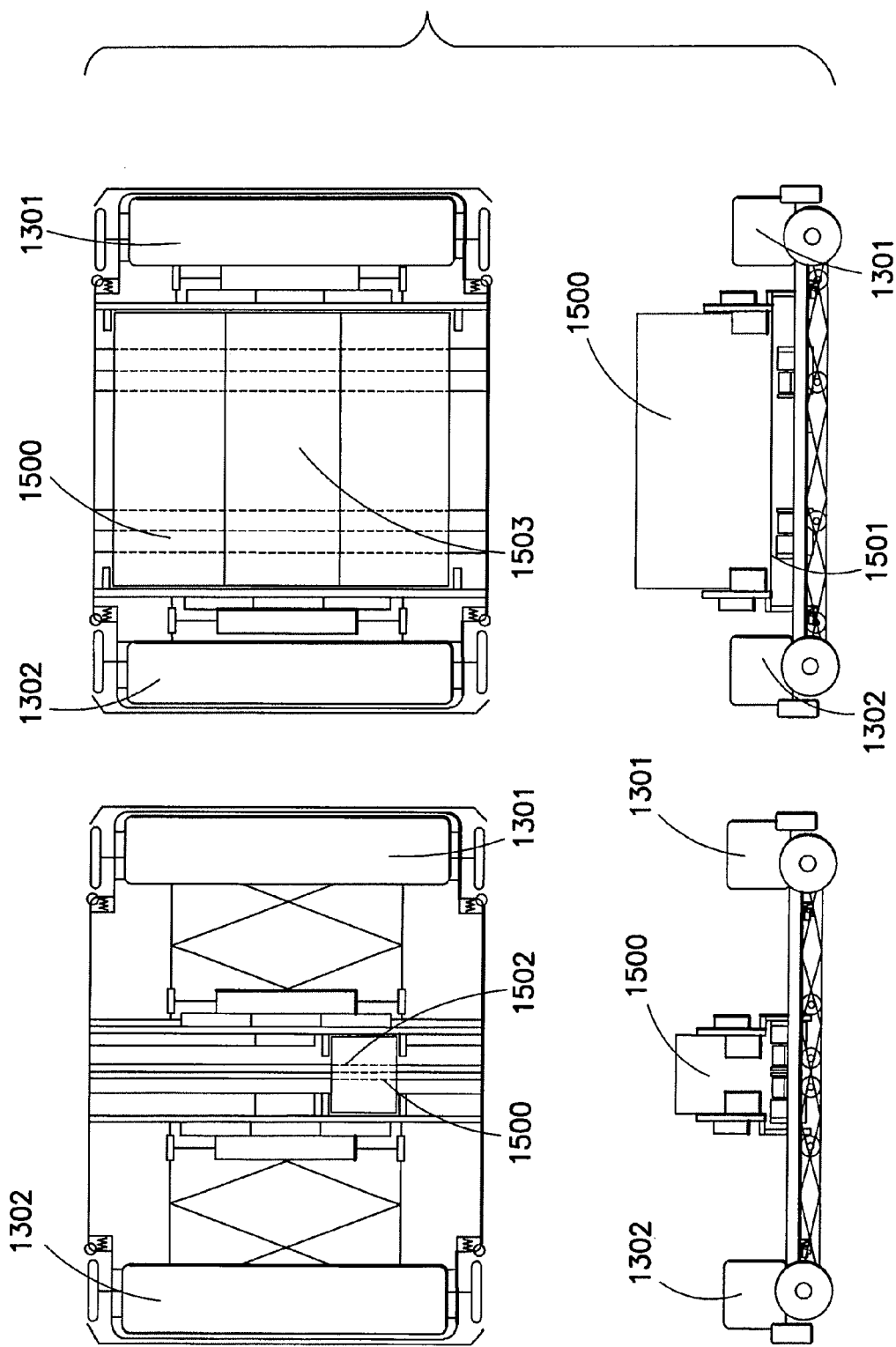
FIG. 15 shows an autonomous transfer and transport vehicle with cases on board and secured for travel according to the preferred embodiment of the invention.

As shown in FIG. 15, once the case payload (1500) is on-board the bot, within the payload bay, it is secured for travel by a pair of gripper assemblies (1310). Mounted within the payload bay outboard of the transfer arms (1307), each assembly consists of a gripper arm (1311) that is essentially a flat panel that presses against the front and back of the case(s) being secured, and gripper fingers (1308) that press against the sides of the cases. Like the transfer arm assemblies (1307), the gripper assemblies (1310) also move longitudinally within the payload bay by means of longitudinal drive motors (1309), and the gripper fingers (1308) move laterally along the gripper arm (1311) by means of finger-drive motors (1309). To secure a payload of cases, the assemblies move towards the center of the vehicle, with the gripper fingers extended to maximum width (slightly wider than the payload bay itself) until the gripper arms (1311) are pressed against the cases (1500), and then the finger drive motors (1309) pull the fingers on each side of each gripper arm (1311) in towards the center of the vehicle until they encounter the sides of the outer cases, repositioning the center of the set of cases in the center of the vehicle in the process. FIG. 15 shows how the gripper assemblies secure a payload of a single, small case (1502) and a payload of three larger cases (1503).

In the preferred embodiment of the invention, the bot is an electrically powered vehicle with a number of onboard electric motors and actuators, and includes a variety of electronic components used for control, sensing, and communication. The primary of these is the embedded control computer (1302) that manages all operation of the autonomous vehicle. This is a conventional microcomputer with a CPU, memory, software stored in memory (firmware), and a number of input/output data ports. The control computer governs the operation of the drive motors and the motors and actuators in the transfer arms (1307) by means of control electronics, and uses input from onboard sensors to control the interaction of the bot with surrounding environment.

Location sensors are critical to enabling the bot to determine its location with the work facility at any moment in time. A wide variety of location-sensing methods are known to those skilled in the art. For example, barcoded labels or RFID tags, each with a unique ID, can be distributed throughout the storage structure at known locations. Readers onboard the bot detect the identity of each such label or tag, thereby establishing the location of the bot at the known location of the label or tag.

Additional sensors that can prove advantageous are those that provide status information to the embedded control computer about bot components, such as drive-wheel RPM and pressure-sensor feedback from the guide-pin assembly, and object-proximity detectors for fail-safe collision-avoidance.

In the preferred embodiment of the invention, the embedded control computer communicates with a master system-control computer by means of an onboard radio-frequency local-area network (RF LAN) interface, such as one based on IEEE 802.11b standards.

Operation of the electric motors, actuators, and all of the electronics in the bot obviously requires a source of electric power, as well as power-conditioning and power-distribution circuitry. There are basically two choices: electrifying the guideways so that power can flow through contact pick-ups on the bot, similar to the way electric trains are powered, or equipping the bots with rechargeable batteries (1301). Of these, the rechargeable battery is the simplest approach and for that reason the one used in the preferred embodiment. It should be noted that these choices are not mutually exclusive, though. For example, it may be advantageous to use rechargeable batteries to avoid the expense and reliability issues involved with electrifying all guideways throughout the facility, but to electrify the guideways around workstations, where bots must spend significant amounts of time moving slowly and queuing for transaction. In this way it would be possible for bots to recharge their batteries without having to reduce duty cycle by taking themselves offline to go to a recharging station.

An order-picking system will typically require an intermediate-storage facility in which to place picking stock, i.e. the merchandise that is available for filling orders. In the present invention, this facility is a multi-level storage structure, which essentially provides bots random access to storage locations where cases can be placed and subsequently picked. In the preferred embodiment of the invention, the storage structure consists of a series of rack assemblies (1703) that perform the intermediate-storage function, and interchange decks that interconnect the storage racks (1700) to provide bots with random access to any picking lane or aisle (1602) at a given level (1704) and also to transfer stations (1605) that interface with vertical conveyors associated with the input (1606) and output workstations (1607).

Figure 16:
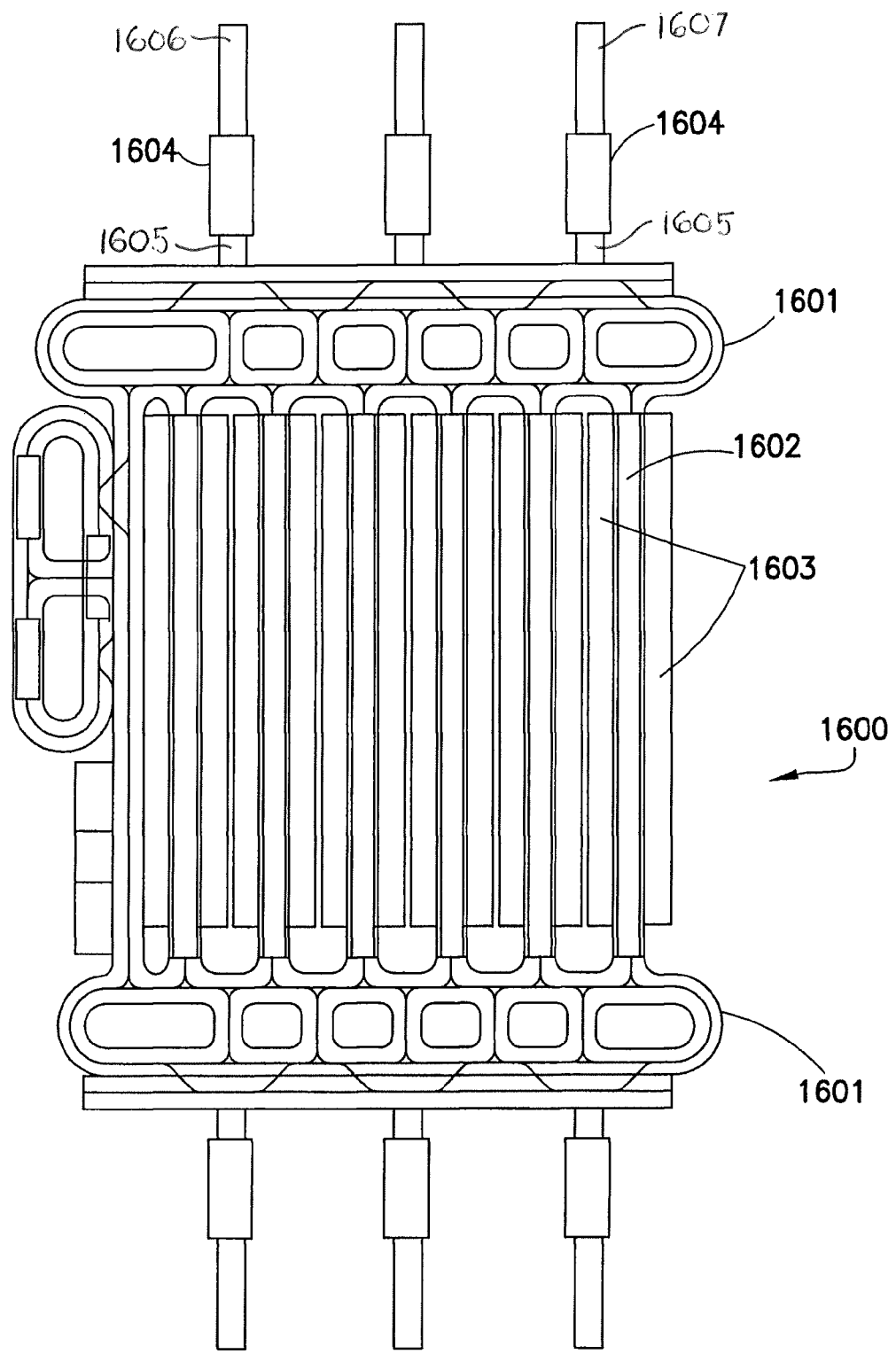
FIG. 16 shows a plan view of a storage structure according to the preferred embodiment of the invention.
Figure 17:
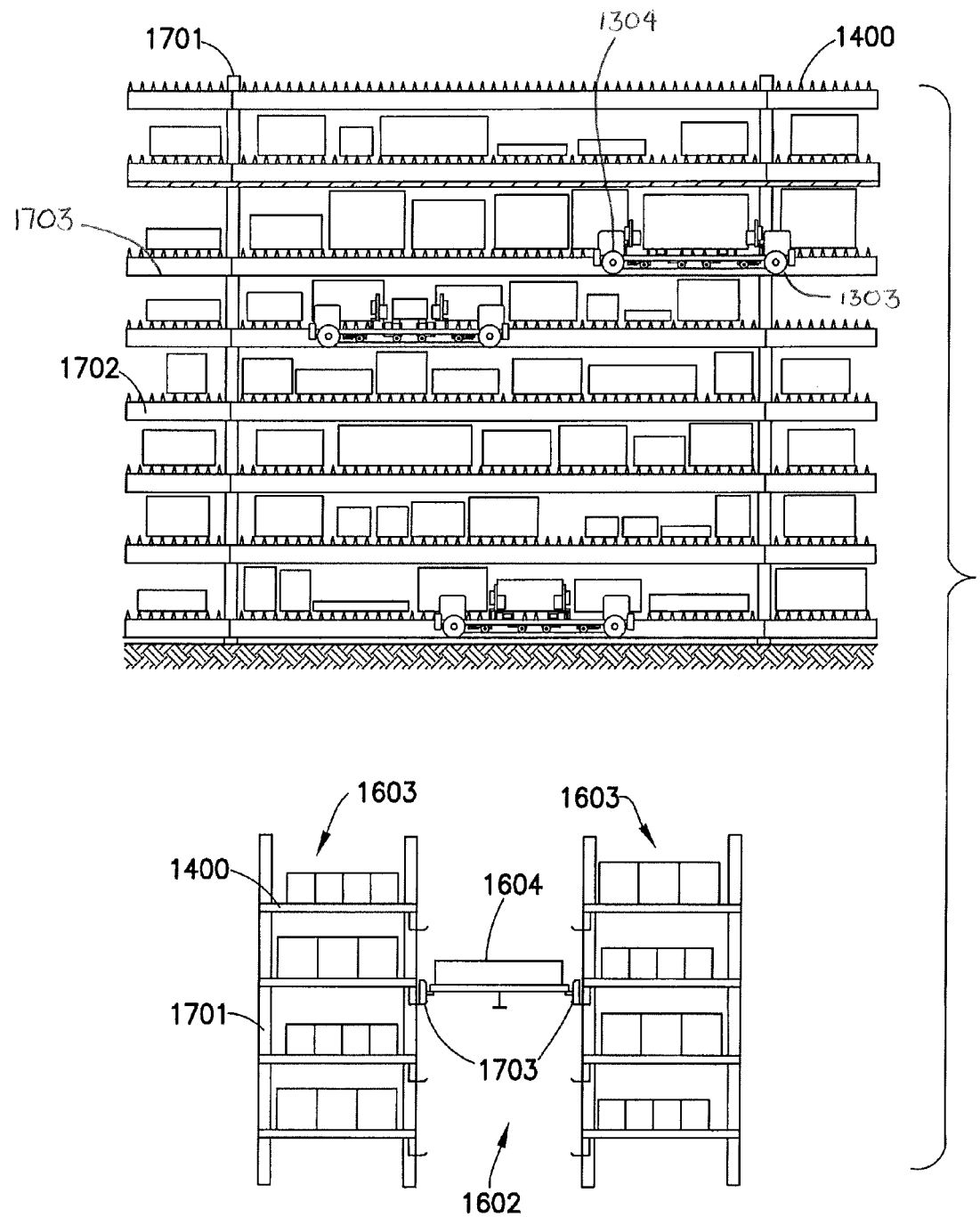
FIG. 17 shows elevation views of storage racks and autonomous transfer and transport vehicles within a storage structure.

FIG. 16 depicts a plan view of a single level of a storage structure according to the preferred embodiment of the invention. FIG. 17 shows storage racks according to the present invention, both from a side-elevation view and from a front-elevation view, with bots shown in operation. The storage structure is comprised of a rectangular storage section (1600), in which cases of merchandise are stored as picking stock, connected at one or both ends to an oval transfer deck (1601), which provides the interface for input and output of the cases. Very narrow picking aisles (1602) are formed by opposing pairs of storage racks (1603) separated by a space slightly wider than a bot (100), within which the bots travel to perform the storage-and-retrieval transactions. Each rack structure resembles standard pallet racks, and indeed can be constructed from pallet-rack components—namely vertical rack frames (1701) and horizontal support beams (1702), but there are three major differences between the two types of structures. First, in the present invention there is a corrugated shelf (1400) spanning between each pair of support beams (1702). Secondly, the shelves are spaced very closely together vertically because the vertical spacing is determined by the height of the cases to be stored and any additional vertical space required by the vehicle's dimensions. (In practice, the typical vertical spacing in storage structures designed for dry-grocery merchandise will be only 16" to 18".) Finally, attached to the horizontal beams (1702) that support the corrugated shelves are tracks (1703) on which the wheels (1303, 1304) of the vehicle run.

Vertical movement of the cases within the structure is a key capability for achieving a highly efficient three-dimensional process model that the present invention affords. One way to accomplish this capability is to have the bot bots themselves carry case payloads up ramps, as described in an earlier application. However, a more cost-effective solution is achieved by using multi-level vertical conveyors (1604) to transport cases vertically between the various levels of the storage structure and the input and output workstations. Thus, instead of picking up and dropping off case payloads at the workstations, as described previously, the bots do so at points that interface with the vertical conveyors.

In the preferred embodiment, these vertical conveyors consist of payload shelves attached to chains or belts that form continuously moving vertical loops, so that the shelves use the "paternoster" principle of continuous conveyance, with loading and unloading performed at any point in the loop without slowing or stopping. An example of such a conveyor for loads of varying dimensions is the Vertical Circulation Conveyor made by NERAK Systems, LLC, of Cross River, N.Y. Similar designs for vertical conveyor are described in U.S. Pat. Nos. 5,050,726, 5,588,790, 6,190,117, 6,378,689, and 7,025,191.

Figure 18:
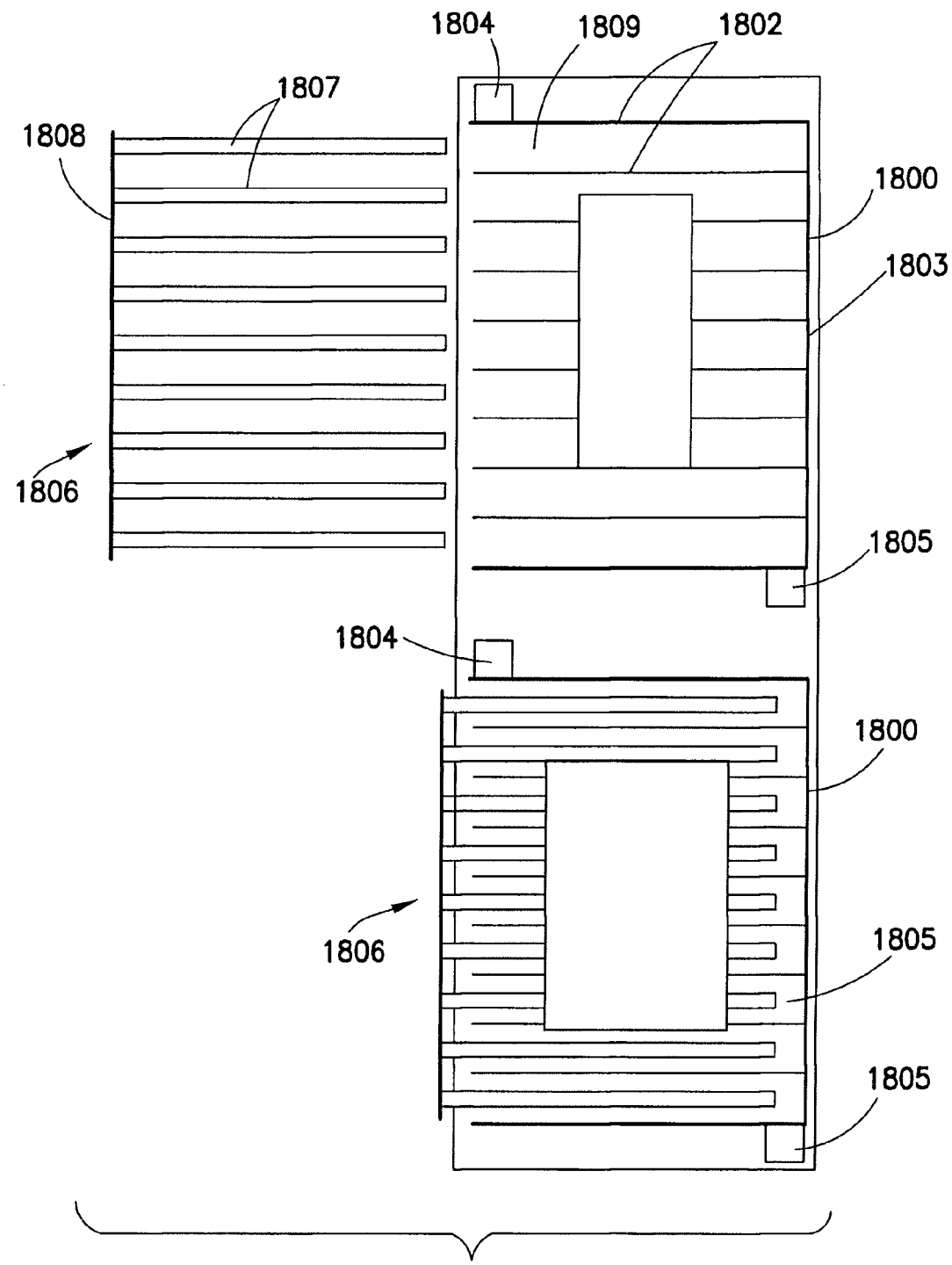
FIG. 18 shows a plan view of a multilevel continuous vertical conveyor and transfer shelves used to move cases of merchandise vertically into and out of the structure according to the preferred embodiment of the invention.

As shown in FIG. 18, each load platform (1800) on the conveyor (1604) is comprised of a series of open fingers (1802) attached at the rear to a common connecting member (1803). Each platform (1800) in a conveyor is attached to two continuous-loop transport chains (1804, 1805) at two opposing corners. In operation, the transport chains (1804,1805) are turned by a drive motor so they all move continuously along a rectangular vertical path. The loading and unloading of these conveyor platforms (1800) can be performed at any point—and at multiple points—throughout the conveyor path by means of transfer devices with transfer shelves (1806) that can be selectively inserted and removed from that path. Each such transfer shelf (1806) has transfer fingers (1807), also attached to a common connecting member (1809). The fingers (1807) of the transfer shelf at the same spacing as the fingers (1802) on the load platforms but offset by one-half interval so that the fingers (1807) in the shelves (1806) align with the spaces (1809) in the platforms (1800) and vice versa. Cases are loaded onto a conveyor platform when that platform is moving upward, by inserting a loaded transfer shelf into the path of the moving conveyor platform. As the conveyor platform passes through the plane of the transfer shelf, its fingers pass through the spaces between the transfer fingers, encountering the bottom of the cases on the transfer shelf, and support of the cases shifts from the transfer shelf to the conveyor shelf and the cases start moving upward with that platform. Once relieved of its load, the transfer shelf is retracted out of the path of the conveyor in order not to interfere with the next loaded platform. Cases are unloaded from the conveyor platform to a transfer shelf in the inverse procedure when the conveyor is moving downward and encounters an empty transfer shelf in its path. Once the case payload has been acquired by the transfer shelf, the transfer shelf retracts out of the conveyor path.

To the bot, the transfer shelf (1806) looks like a storage shelf (1400) in the structure, i.e. the fingers of the transfer shelf (1807) are the functional analog to the ridges (1401) of the corrugated shelf so bots can transfer cases onto and off of the transfer shelf just as they do with storage shelves.

As has been noted, in the preferred embodiment of the present invention, the operation of all bots within a work facility is controlled by a master system-control computer, which communicates with individual bots via an RF-LAN. The master computer also controls the operation of all of the transfer shelves associated with the input and output vertical conveyors.

The system master computer performs a number of executive processes within a given application, but the two processes that directly affect the bots are task scheduling and traffic control. The task-scheduling function takes as input a stream of tasks that need to be performed by bots within a rolling window of time into the future, and the fleet of operational bots available to perform those tasks, and produces a rolling schedule specifying which tasks are to be performed by which bots at what times. A simple example of a scheduled task for a given bot might be: go to location A to arrive by time X, transfer carrier tray from base platform on right side of vehicle onto payload bay, take payload to location B to arrive by time Y, and transfer onto base platform to left of vehicle. (The task-scheduling software is responsible for managing the entire fleet of operational bots, so that any time there is idle bot capacity, i.e., fewer bots needed to perform tasks than are available, the task-scheduler will create a "park and wait for further instructions" task.)

The scheduled tasks that are output by the task-scheduling process on the system master computer are then input to the traffic-control process, which performs a function very similar to what air-traffic controllers do in the system of air travel. The traffic-control function decomposes each scheduled task into a series of very specific routing instructions, or "vectors", that ensure that the task is accomplished successfully while avoiding collision with any other bot. For example, the traffic-control process would instruct the bot, starting from a specified location at a specified time, to travel to a second specified location and arrive at a second specified time, execute a turn at a specified fork to change to a different guideway, and so forth until the entire routing task assigned by the scheduler has been completed.

These routing instructions are transmitted to the bot over the RF-LAN, along with a time-synchronization signal to ensure the bot operates on the same time-base as the system master computer. At this point, the bot assumes responsibility for executing those routing instructions precisely as given. The bot also reports back in to the traffic-control process as each routing instruction is performed to provide a feedback loop, in effect permitting the traffic-control process to create a virtual "radar screen" of all bot activity and ensure that operations are going as planned. Of course, when unexpected events occur and operations don't go as planned, both of these processes must have robust problem-solving logic to try to stabilize operations, which would include raising alerts and/or alarms to human supervisory staff to take action.

Note that this recommended software architecture is only one possible approach. It has the advantage of running the most complex software processes in the system master computer, which can be a very powerful server-class machine, rather than in the bots embedded control computer, thereby minimizing the amount of computational power—and thus the cost—required in the bot itself. Those skilled in the art, however, will recognize that other methods and embodiments are readily possible.

Conclusion

It is to be understood that the methods and apparatus which have been described above are merely illustrative applications of the principles of the invention. Numerous modifications may be made by those skilled in the art without departing from the true spirit and scope of the invention.

What is claimed is:

1. An automated product selection system for combining packages containing different products in an outbound container comprising, in combination, a warehouse of temporary storage locations having a plurality of vertically stacked storage levels, each of said storage locations being located immediately adjacent to a vehicle support roadway in a network of roadways, a source transfer station adjacent to one of said roadways in said network of roadways, a destination transfer station adjacent to one of said roadways in said network of roadways, a plurality of wheeled transport vehicles each of which is movable from its current location in said network of roadways to a specified target location in said network of roadways in response to a movement command, each wheeled transport vehicle being configured to traverse the network of roadways and access all storage locations of at least one vertically stacked storage level, a plurality of incoming cases each containing the same kind of product item units delivered to said source transfer station from a remote manufacturing source, means located at said source transfer station for transferring individual ones of said cases onto individual ones of said wheeled transport vehicles, a programmed processor configured to issue a command to move each given wheeled transport vehicle receiving a case at said source transfer station to a designated one of said storage locations, a case transport mechanism on said given wheeled transport vehicles for transferring the case mounted thereon to said designated storage location when said given transport vehicle arrives at said designated storage location, said programmed processor being further configured to issue one or more movement commands to move a specified wheeled transport vehicle to a specified storage location where a given one of said different products is stored, a case transport mechanism on said specified wheeled transport vehicle for transferring the case stored at said specified storage location to said specified wheeled transport vehicle, said programmed processor being further configured to issue one or movement commands to move said specified wheeled transport vehicle to said destination transfer station, and means at said destination transfer station for transferring all or part of the contents of the case on said specified wheeled transport vehicle to said outbound container.

2. An automated product selection system for combining packages containing different products in an outbound container as set forth in claim 1 wherein the plurality of vertically stacked storage levels each comprises multiple storage locations positioned on the same horizontal level adjacent to a substantially level subnetwork of roadways.

3. An automated product selection system for combining packages containing different products in an outbound container as set forth in claim 2 wherein each subnetwork of roadways is joined to a subnetwork on a different one of said vertically stacked storage levels by an inclined ramp roadway for transporting said wheeled transport vehicles between different storage levels.

4. An automated product selection system for combining packages containing different products in an outbound container as set forth in claim 2 wherein a source transfer station and a destination transfer station are located on each of said stacked storage levels and further comprising a vertical input conveyer for transporting selected ones of said incoming cases to the source transfer station on a selected one of said vertical storage levels.

5. An automated product selection system for combining packages containing different products in an outbound container as set forth in claim 3 further comprising a vertical output conveyer for transporting cases from the destination transfer stations on selected ones of said of said vertical storage levels to said outbound container.

6. An automated product selection system for combining packages containing different products in an outbound container as set forth in claim 1 wherein each of said wheeled transport vehicles includes a steering mechanism responsive to steering commands issued by said programmed processor for controlling the vehicle's direction of movement on said network of roadways.

7. An automated product selection system for combining packages containing different products in an outbound container as set forth in claim 1 further including position sensing means for determining and storing data accessible to said programmed processor indicating the current position of each of said wheeled transport vehicles on said on said network of roadways.

8. An automated materials handling system comprising, in combination, a programmed processor for issuing command signals, a plurality of autonomous wheeled transport vehicles coupled to said processor and responsive to command signals from said programmed processor for transporting a case from a specified origin location to a specified destination location, each of said cases being filled at a remote manufacturing location with item units of the same kind, a warehouse of temporary storage locations positioned on each of a plurality of different vertical levels, each of said levels comprising:

at least one input transfer station, at least one output transfer station, a plurality of aisle guideways each of which supports and guides one or more of said wheeled transport vehicles for movement between of a pair of opposing rows of horizontally distributed temporary storage locations, an input interconnecting guideway that supports and guides one or more of said wheeled transport vehicles for movement between said input transfer station and each of said aisle guideways, and an output interconnecting guideway that supports and guides one or more of said wheeled transport vehicles for movement between said output transfer station and each of said aisle guideways, at least one input receiving station for receiving cases transported from remote manufacturing locations to said receiving station on pallets, an input conveyor including a vertical transport mechanism responsive to command signals from said processor for selectively transporting each case received at said at least one input receiving station to an input transfer station positioned on a specified one of said vertical levels, at least one output order assembly station for combining item units ordered by customer into outbound shipments, an output conveyor including a vertical transport mechanism for transporting cases delivered to the output transfer stations on each of said vertical levels to said at least one output order assembly station, said programmed processor being configured to issue one or more command signals to said input conveyer for transporting each given case received at said at least one input receiving station to a specified one of said vertical levels and for issuing one or more command signals to a designated one of said wheeled vehicles to transport said given case via said input interconnecting guideway on said specified one of said levels and a specified one of said aisle guideways on said specified one of said levels to a specified one of said temporary storage locations, and for transferring said given case from said wheeled vehicle to said specified one of storage locations, said programmed processor being further configured to issue command signals to a particular one of said wheeled vehicles to retrieve and transport a particular case from a particular one of said temporary storage locations on a particular one of said levels to an output transfer station on said particular one of said levels from which said particular case is transported via said output conveyor to said output order assembly station and included in said outbound shipment.

9. An automated materials handling system as set forth in claim 8 wherein said input interconnecting guideway on each of said vertical levels includes branching roadways at branching locations and wherein each of said wheeled transport vehicles includes a steering mechanism responsive to a command signal from said programmed processor for following a selected one of said branching roadways when one of said branching locations is encountered in said input interconnecting guideway.

10. An automated materials handling system as set forth in claim 8 wherein said programmed processor includes a memory for storing data accessible to said programmed processor indicating the current position of each of said wheeled transport vehicles on said network of roadways.

11. An automated materials handling system as set forth in claim 8 further including at least one inclined ramp roadway for transporting one or more wheeled transport vehicles between two different ones of said vertical levels.

12. An automated materials handling system as set forth in claim 8 wherein each of said transport vehicles includes a powered transport mechanism for transferring cases onto and off of said transport vehicle.

13. An automated materials handling system as set forth in claim 8 wherein said transport vehicles includes a powered transport mechanism for transferring between said transport vehicle and temporary storage locations on either side of the aisle guideway supporting said transport vehicle.

14. An automated materials handling system as set forth in claim 8 further including apparatus for removing at least a portion of some of said cases to expose and permit access to the packaged items contained in said some of said cases at said order assembly station.

15. An automated materials handling system as set forth in claim 8 wherein automated materials handling system forms part of a retail store and wherein said programmed processor is coupled to a sales terminal for accepting a purchase order from a consumer identifying a plurality of different packaged items contained in cases in said specified ones of said temporary storage locations which are thereafter retrieved and transferred to one or more outgoing containers for delivery to said consumer.

\* \* \* \* \*